US012589679B2

(12) United States Patent
Zhang

(10) Patent No.: US 12,589,679 B2
(45) Date of Patent: Mar. 31, 2026

(54) CHILD SAFETY SEAT AND SEAT BASE

(71) Applicant: Bambino Prezioso Switzerland AG, Steinhausen (CH)

(72) Inventor: Daliang Zhang, Steinhausen (CH)

(73) Assignee: Bambino Prezioso Switzerland AG, Steinhausen (CH)

( * ) Notice: Subject to any disclaimer, the term of this patent is extended or adjusted under 35 U.S.C. 154(b) by 145 days.

(21) Appl. No.: 18/255,730

(22) PCT Filed: Dec. 10, 2021

(86) PCT No.: PCT/EP2021/085283
§ 371 (c)(1),
(2) Date: Jun. 2, 2023

(87) PCT Pub. No.: WO2022/123048
PCT Pub. Date: Jun. 16, 2022

(65) Prior Publication Data
US 2024/0001817 A1      Jan. 4, 2024

(30) Foreign Application Priority Data
Dec. 11, 2020   (CN) .......................... 202011441086.3

(51) Int. Cl.
*B60N 2/28* (2006.01)

(52) U.S. Cl.
CPC .......... *B60N 2/2821* (2013.01); *B60N 2/2824* (2013.01); *B60N 2/2827* (2013.01)

(58) Field of Classification Search
CPC ... B60N 2/2821; B60N 2/2824; B60N 2/2827
See application file for complete search history.

(56) References Cited

U.S. PATENT DOCUMENTS 7,416,254 B2    8/2008  Jennings
7,819,472 B2    10/2010  Hutchinson et al.
(Continued)

FOREIGN PATENT DOCUMENTS

CN       102686446 A       9/2012
CN       102910093 A       2/2013
(Continued)

OTHER PUBLICATIONS

Office Action issued in corresponding Chinese Application No. 202111508756.3 dated Dec. 1, 2023.
(Continued)

*Primary Examiner* — Syed A Islam
(74) *Attorney, Agent, or Firm* — Volpe Koenig

(57) ABSTRACT

A child safety seat and a seat base for the child safety seat are provided. The seat base includes a buckling mechanism, an indication mechanism, and a linkage mechanism. The buckling mechanism is configured to buckle into a seat body. The indication mechanism includes an indication area, which is configured to indicate a buckling state of the seat base and the seat body. The linkage mechanism is disposed between the buckling mechanism and the indication mechanism. When the buckling mechanism is buckled into the seat body, the linkage mechanism drives the indication area to present a first indication state; and when the buckling mechanism is unbuckled from the seat body, the linkage mechanism drives the indication area to present a second indication state.

18 Claims, 34 Drawing Sheets

(56) References Cited

U.S. PATENT DOCUMENTS

| | | | | |
|---|---|---|---|---|
| 9,061,609 | B2 * | 6/2015 | Hou | B60N 2/2887 |
| 9,085,250 | B2 * | 7/2015 | Cheng | B60N 2/2872 |
| 9,168,849 | B2 | 10/2015 | Chen | |
| 9,216,672 | B2 | 12/2015 | Windecker et al. | |
| 9,597,986 | B2 * | 3/2017 | Hou | B60N 2/43 |
| 9,873,359 | B2 | 1/2018 | Williams | |
| 10,589,643 | B2 | 3/2020 | Sack | |
| 12,269,381 | B2 * | 4/2025 | Zhang | B60N 2/2869 |
| 2008/0041126 | A1 | 2/2008 | Yu | |
| 2014/0001804 | A1 * | 1/2014 | Chen | B60N 2/286 |
| | | | | 297/256.16 |
| 2015/0048660 | A1 | 2/2015 | Hou et al. | |
| 2023/0256875 | A1 * | 8/2023 | Zhang | B60N 2/2845 |
| | | | | 297/256.12 |
| 2023/0391233 | A1 * | 12/2023 | Zhang | B60N 2/2869 |
| 2024/0270132 | A1 * | 8/2024 | Toonders | B60N 2/2845 |

FOREIGN PATENT DOCUMENTS

| | | | |
|---|---|---|---|
| CN | 203237081 U | 10/2013 | |
| CN | 103507671 B | 1/2014 | |
| CN | 103568893 A | 2/2014 | |
| CN | 203713613 U | 7/2014 | |
| CN | 104290621 A | 1/2015 | |
| CN | 206124823 U | 4/2017 | |
| CN | 107585065 A | 1/2018 | |
| CN | 108297749 A | 7/2018 | |
| CN | 109228977 A | 1/2019 | |
| CN | 111845485 B | 6/2024 | |
| DE | 102004045988 B3 | 12/2005 | |
| DE | 202013104481 U1 | 3/2014 | |
| DE | 102017115291 B4 | 8/2021 | |
| EP | 1728675 A1 | 12/2006 | |
| EP | 2551150 A2 | 1/2013 | |
| EP | 2720903 B1 | 9/2015 | |
| EP | 3954576 A1 | 2/2022 | |
| GB | 2530375 A | 3/2016 | |
| GB | 2493427 B | 11/2017 | |
| GB | 2554144 B | 12/2019 | |
| GB | 2530375 B | 8/2020 | |
| JP | 2009-113791 A | 5/2009 | |
| JP | 2017222265 A | 12/2017 | |
| JP | 3218479 U | 10/2018 | |
| NO | 20110855 A1 | 12/2012 | |
| TW | 201623045 A | 7/2016 | |
| TW | I574863 8 | 3/2017 | |
| TW | I574863 B | 3/2017 | |
| TW | I624386 B | 5/2018 | |
| TW | 202216500 A | 5/2022 | |
| WO | 0149144 A1 | 7/2001 | |
| WO | 2014089619 A1 | 6/2014 | |

OTHER PUBLICATIONS

Office Action issued in corresponding Taiwanese Application No. 112134725 dated Dec. 5, 2023.

"Development of Class B Device Performance Test System for Child-Safety Seat" Mechanical Research & Application, Feb. 2015 (English Abstract Included).

"Swivel Seat Stroller Structure Design" Automation Application, May 2018 (English Abstract Included).

Taiwanese Office Action for Application No. 110146411 dated Oct. 7, 2022. English translation provided.

International Search Report and Written Opinion for PCT/EP2021/085283 dated Apr. 8, 2022.

First Office Action Issued in Corresponding Japanese Patent Application No. 2023-535282, Mailed Date: Aug. 13, 2024, 6 pages.

Office Action issued in corresponding TW Application No. 114107756 along with partial translation, dated Jun. 4, 2025.

Office Action issued in corresponding EP Application No. 21839827.9, dated Aug. 14, 2025.

Notice of Allowance for corresponding Japanese Application No. 2025-016689 dated Feb. 12, 2026, 5 pages.

* cited by examiner

100

CHILD SAFETY SEAT AND SEAT BASE

CROSS REFERENCES TO RELATED APPLICATIONS

This application is a U.S. national phase application under 35 U.S.C. § 371 based upon International Patent Application No. PCT/EP2021/085283, filed on Dec. 10, 2021, which claims the priority of Chinese Patent Application No. 2020114410863, titled "CHILD SAFETY SEAT AND CHILD SAFETY SEAT BASE", filed on Dec. 11, 2020, the disclosures of which are incorporated in their entirety herein by reference.

TECHNICAL FIELD

The present disclosure relates to the technical field of infant carriers, and in particular, to a child safety seat and a seat base.

BACKGROUND

Child safety seats need to be correctly used to protect children. A child safety seat mainly includes a seat body and a seat base. During use, the seat base is connected to a seat of a car, and the seat body may be fastened onto the seat base in a forward or reverse direction. Currently, most child safety seats have no mounting or usage state warning apparatus. When a child safety seat is mounted for a user, an operator subjectively determines whether the seat body and the seat base are fully buckled. As a result, incorrect human determining may easily bring risks to a child who is seated. Some other child safety seats on the market have a local indication function, for example, have indication apparatuses for displaying a connection state of an ISOFIX connector. However, the structures of these indication apparatuses are generally complex, which increases manufacturing difficulty and manufacturing costs of child safety seats.

SUMMARY

Based on this, it is necessary to provide a child safety seat and a seat base. The child safety seat and the seat base have simple structures, facilitate a user in observing a connection state of the seat base and a seat body, and are highly safe.

A seat base of a child safety seat comprises:
a buckling mechanism configured to buckle into a seat body;
an indication mechanism comprising an indication area, wherein the indication area is configured to indicate a buckling state of the seat base and the seat body; and
a linkage mechanism disposed between the buckling mechanism and the indication mechanism;
wherein when the buckling mechanism is buckled into the seat body, the linkage mechanism drives the indication area to present a first indication state; and when the buckling mechanism is unbuckled from the seat body, the linkage mechanism drives the indication area to present a second indication state.

In the aforementioned seat base of the child safety seat, the buckling mechanism implements buckling between the seat base and the seat body, and when the buckling mechanism is buckled into the seat body or is unbuckled from the seat body, the linkage mechanism can drive the indication area to present different indication states. In this way, the user may conveniently view the connection state of the base and the seat body. This is more convenient and highly safe during use. In addition, the seat base has a simple structure, and both manufacturing difficulty and manufacturing costs are low.

In an embodiment, the seat base further comprises a mounting base, wherein the linkage mechanism comprises:
a rotation element rotatably connected inside the mounting base; and
a linkage element connected to the rotation element and the indication area;
wherein when the seat base is buckled into the seat body, the rotation element rotates to drive the linkage element to drive the indication area to present the first indication state, and when the seat base is unbuckled from the seat body, the rotation element rotates to drive the linkage element to drive the indication area to present the second indication state.

In an embodiment, the linkage mechanism further comprises a first restoration element, two ends of the first restoration element respectively abut against the linkage element and the mounting base, and the first restoration element constantly enables the linkage element to move towards a direction that drives the indication area to present the second indication state.

In an embodiment, the linkage mechanism further comprises a push button movably disposed on the mounting base, the push button abuts against the buckling mechanism and the rotation element, respectively, and the buckling mechanism is capable of driving the push button to slide, so that the push button pushes the rotation element to rotate.

In an embodiment, the linkage mechanism further comprises a second restoration element, two ends of the second restoration element respectively abut against the mounting base and the push button, and the second restoration element constantly enables the push button to move towards a direction reverse to a direction along which the push button is pushed by the buckling mechanism.

In an embodiment, the buckling mechanism comprises a sliding element slidably disposed on the mounting base, when the sliding element slides, the sliding element is capable of pushing the push button to move along a direction that intersects a sliding direction of the sliding element, and when the push button moves, the push button drives the rotation element to rotate to drive the linkage element to move.

In an embodiment, a push protrusion that protrudes along a direction that intersects the sliding direction of the sliding element is disposed on the sliding element, and when the sliding element slides, the push protrusion pushes the push button to move.

In an embodiment, the buckling mechanism further comprises a locking hook that is pivotally connected to the mounting base and has an opened position and a closed position, the locking hook is configured to be detachably fastened to the seat body, and the sliding element is capably of maintaining the locking hook in the opened position or the closed position.

In an embodiment, the buckling mechanism further comprises a third restoration element, two ends of the third restoration element respectively abut against the sliding element and the mounting base, and the third restoration element constantly enables the sliding element to move towards a direction that maintains the locking hook in the opened position.

In an embodiment, the buckling mechanism further comprises a fastening element mounted on the mounting base and a fifth restoration element connected to the fastening element, the locking hook is pivotally connected to the fastening element and abuts against the fifth restoration element, and the fifth restoration element constantly enables the locking hook to rotate towards the opened position.

In an embodiment, the buckling mechanism further comprises a stopper and a sixth restoration element, one end of the stopper is pivotally connected to the mounting base, the other end of the stopper is connected to the locking hook, the sixth restoration element abuts against the stopper and the mounting base, respectively, and the sixth restoration element constantly enables the locking hook to rotate towards the opened position.

In an embodiment, the seat base further comprises an unlocking mechanism, wherein the unlocking mechanism is disposed on the mounting base and is configured to drive the sliding element to slide.

In an embodiment, the unlocking mechanism comprises a drive element and a first mandrel that slidably cooperate with each other, the drive element is slidably mounted on the mounting base, the first mandrel is movably disposed and abuts against the sliding element, and when the drive element moves under a force, the drive element is capable of driving the first mandrel to move along a direction that intersects a sliding direction of the drive element, so that the first mandrel pushes the sliding element to drive the sliding element to slide.

In an embodiment, a drive chute that intersects the sliding direction of the drive element is provided on the drive element, a first guide rod is disposed on the first mandrel, the first guide rod is inserted inside the drive chute and moves along the drive chute, and when the drive element slides, the drive chute acts on the first guide rod to drive the first mandrel to move.

In an embodiment, the unlocking mechanism further comprises a second mandrel, the second mandrel is movably disposed between the first mandrel and the sliding element, and when the first mandrel moves, the first mandrel pushes the second mandrel to move co-directionally, so that the second mandrel drives the sliding element to slide.

In an embodiment, a driving slope is provided at an end portion of the second mandrel, the sliding element is provided with a driven slope that cooperates with the driving slope, and the driving slope acts on the driven slope to drive the sliding element to slide.

In an embodiment, the unlocking mechanism further comprises a handle movably mounted on the mounting base, the handle is connected to the drive element, and the handle drives the drive element to move.

In an embodiment, the unlocking mechanism further comprises a pulling element connected between the handle and the drive element.

In an embodiment, the handle is disposed at an end of the mounting base adjacent to the indication mechanism.

In an embodiment, the unlocking mechanism further comprises a fourth restoration element, the fourth restoration element abuts against the drive element and the mounting base, respectively, and the fourth restoration element is configured to drive the drive element to restore.

In an embodiment, the unlocking mechanism comprises a first pivoting element and a first push element, the first pivoting element is pivotally connected to the mounting base, the first push element is movably disposed and is capable of driving the sliding element to move, and when the first pivoting element rotates under a force, the first pivoting element is capable of driving the first push element to move along a direction that intersects a sliding direction of the sliding element, so that the first push element drives the sliding element to slide.

In an embodiment, the mounting base is provided with a drive guide groove that intersects the sliding direction of the sliding element, a second guide rod is disposed on the first push element, the second guide rod is connected to the first pivoting element, the second guide rod is inserted inside the drive guide groove and moves along the drive guide groove, and when the first pivoting element rotates, the drive guide groove acts on the second guide rod to drive the first push element to move.

In an embodiment, the unlocking mechanism further comprises a second push element and a second pivoting element, the second push element is movably disposed between the first push element and the sliding element, the second pivoting element is pivotally connected to the second push element and abuts against the sliding element, and when the first push element moves, the first push element pushes the second push element to move co-directionally, so as to drive the second pivoting element to rotate and simultaneously push the sliding element to slide.

In an embodiment, the unlocking mechanism further comprises at least one handle movably mounted on the mounting base, the at least one handle is connected to the first pivoting element, and the at least one handle drives the first pivoting element to rotate.

In an embodiment, the unlocking mechanism further comprises a pulling element connected between the at least one handle and the first pivoting element.

In an embodiment, the at least one handle is disposed on a side that is of the mounting base and that is along the sliding direction of the sliding element.

In an embodiment, the unlocking mechanism further comprises a seventh restoration element, the seventh restoration element abuts against the first pivoting element and the mounting base, respectively, and the seventh restoration element is configured to drive the first pivoting element to restore.

In an embodiment, the indication mechanism further comprises an indication window disposed on the mounting base, and the indication area is aligned the indication window.

A child safety seat comprises the foregoing seat base and a seat body detachably fastened on the seat base.

In an embodiment, the seat base is provided with a buckling groove, the buckling mechanism partially protrudes into the buckling groove, and a buckling rod configured to buckle into the buckling mechanism is disposed at the bottom of the seat body.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
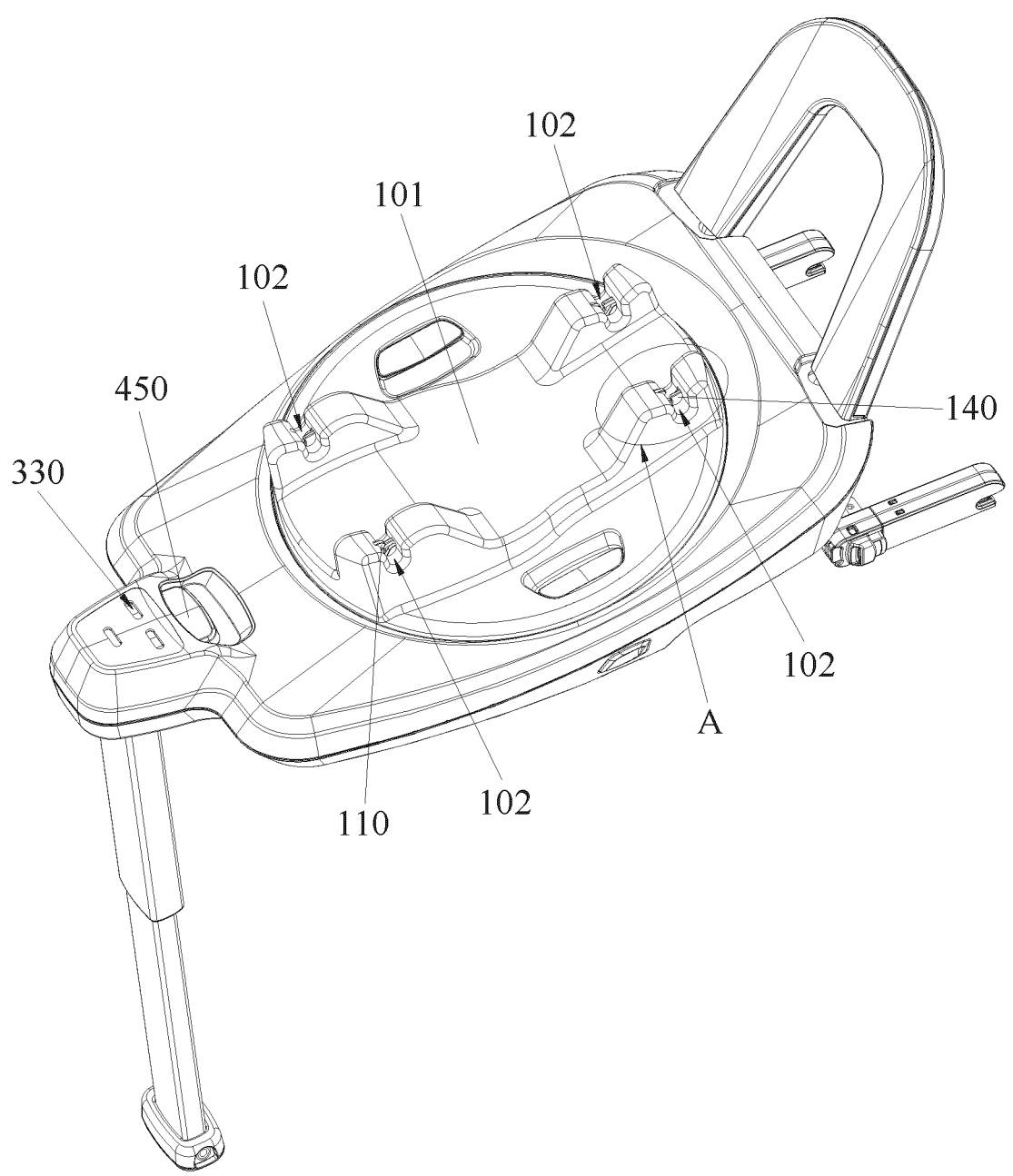
FIG. 1 is a perspective view of a seat base according to an embodiment of the present disclosure.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
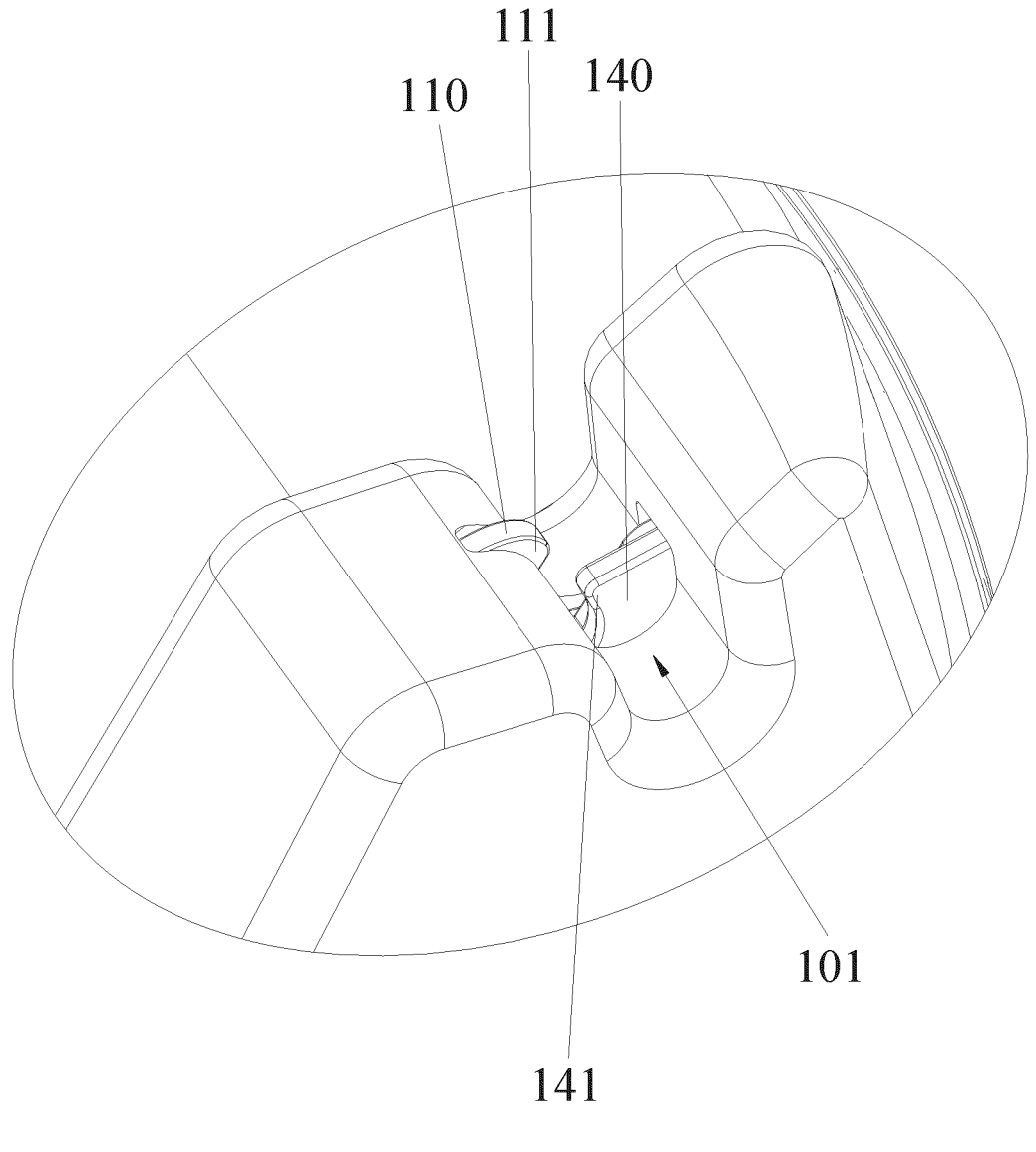
FIG. 2 is an enlarged view of a portion A in FIG. 1.
Figure 3:
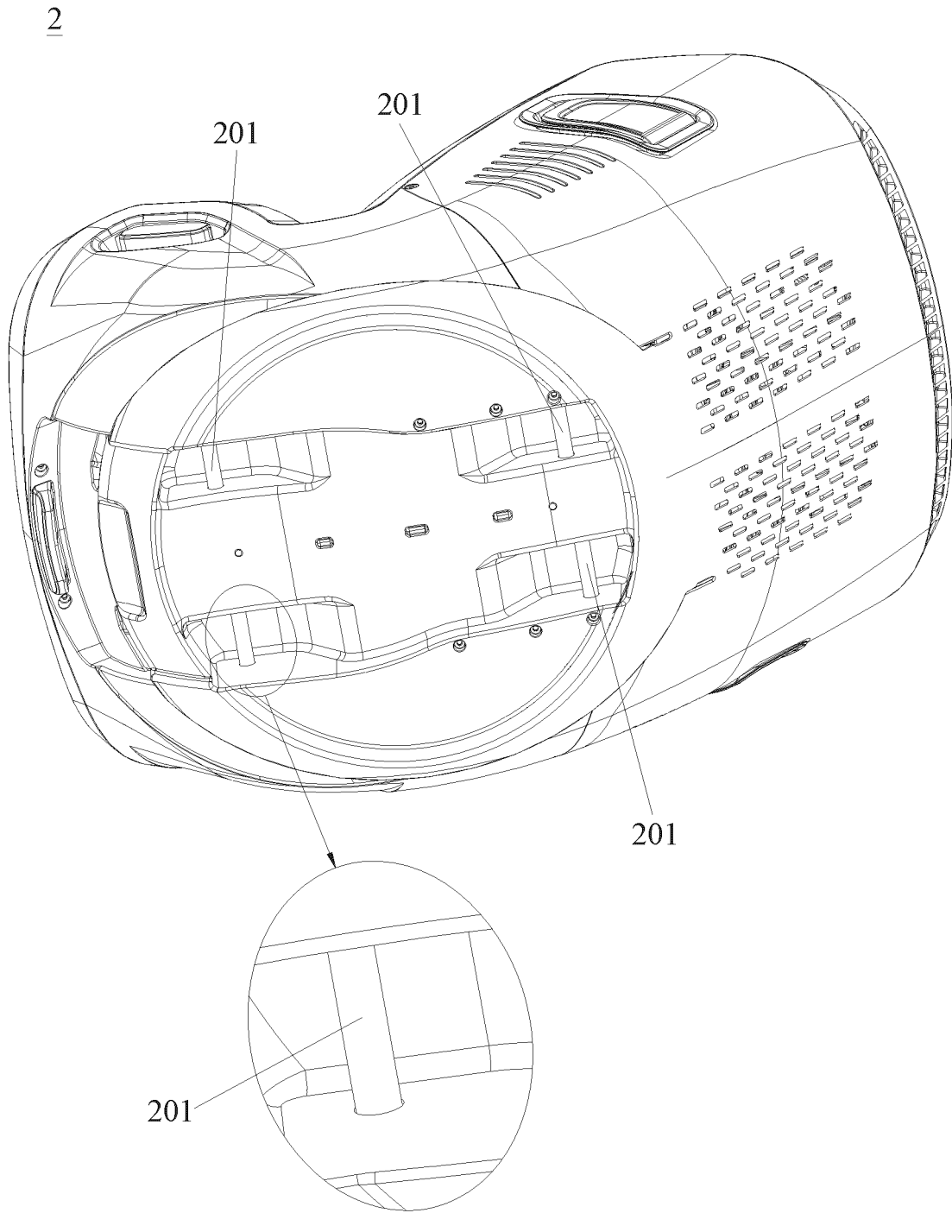
FIG. 3 is a perspective view of a seat body according to an embodiment of the present disclosure.
Figure 18:
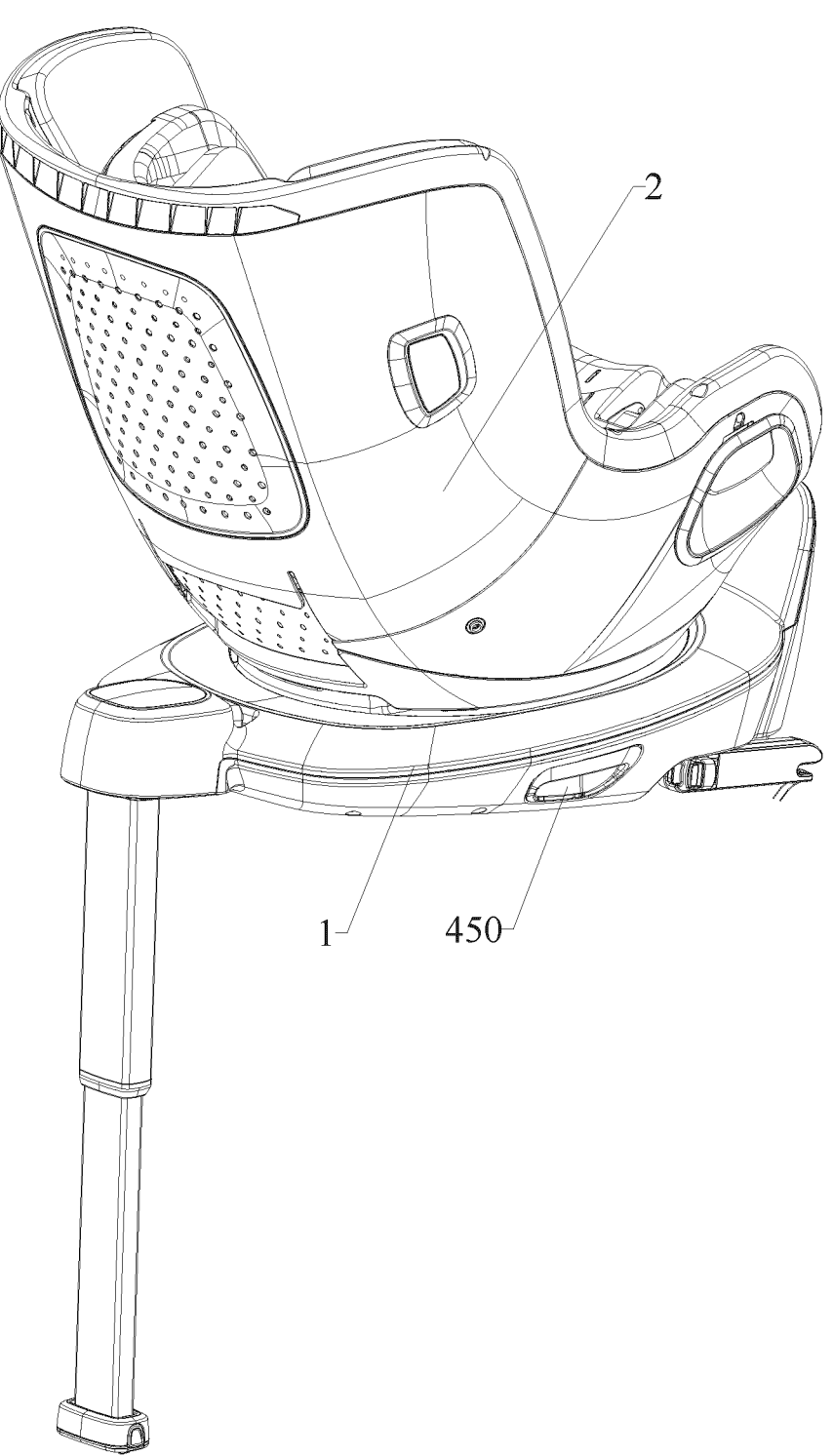
FIG. 18 is a perspective view of a child safety seat according to another embodiment of the present invention.

Referring to FIG. 1, FIG. 2, and FIG. 18, embodiments of the present disclosure provide a child safety seat. The child safety seat includes a seat base 1 and a seat body 2, and the seat body 2 is detachably fasted onto the seat base 1. The child safety seat has a simple structure, facilitates a user in observing a connection state of the seat base 1 and a seat body 2, and is highly safe.

Referring to FIG. 1 to FIG. 3, FIG. 6, FIG. 10, and FIG. 18 to FIG. 20, the seat base 1 includes a buckling mechanism 100, a linkage mechanism 200, an indication mechanism 300, an unlocking mechanism 400, and a mounting base 101. The buckling mechanism 100 is configured to buckle and lock the seat base 1 and the seat body 2. When the buckling mechanism 100 is unlocked, the seat body 2 may be detached from the seat base 1. The indication mechanism 300 includes an indication area, which can be configured to indicate a buckling state of the seat base 1 and the seat body 2. The linkage mechanism 200 is disposed between the buckling mechanism 100 and the indication mechanism 300. When the seat base 1 is buckled into the seat body 2, the buckling mechanism 100 drives the indication mechanism 300 to move, so as to change an indication state of the indication area to a first indication state. When the seat body 2 is detached from the seat base 1, the indication state of the indication area is changed to a second indication state, so that a user conveniently observes the fastening state of the seat body 2 and the seat base 1 in a mounting or usage process, thus ensuring that the seat body 2 and the seat base 1 are fully mounted. The unlocking mechanism 400 is configured to drive the buckling mechanism 100 to unlock.

Referring to FIG. 1 to FIG. 4, the mounting base 101 is provided with a buckling groove 102. The buckling mechanism 100 is mounted inside the mounting base 101, and a locking hook 110 (details will be described below) of the buckling mechanism 100 protrudes into the buckling groove 102. A buckling rod 201 for buckling into the locking hook 110 is disposed at a bottom of the seat body 2. The buckling rod 201 is buckled into the buckling groove 102 and is locked to the locking hook 110, and the seat base 1 and the seat body 2 are buckled and locked. When the buckling rod 201 is detached from the locking hook 110, the seat body 2 may be detached from the seat base 1.

In the illustrated embodiment, the mounting base 101 may be provided with four buckling grooves 102, each of the front and rear ends of the seat base 1 is provided with two buckling grooves 102, and two buckling grooves 102 at each end are provided at intervals. Correspondingly, four buckling mechanisms 100 are provided (referring to FIG. 4), each buckling mechanism 100 is disposed in one-to-one correspondence with the buckling groove 102, and the locking hook 110 of each buckling mechanism 100 protrudes into the buckling groove 102. Four or two buckling rods 201 are disposed at the bottom of the seat body 2, and are correspondingly buckled into the four buckling grooves 102. It may be understood that the number of the buckling grooves 102 and the buckling rods 201 are both not limited thereto, and may be flexibly configured according to needs.

Referring to FIG. 4 and FIG. 5, FIG. 8, FIG. 12, and FIG. 13, structures of the four buckling mechanisms 100 are the same, two buckling mechanisms 100 at the front end of the seat base 1 are symmetrically disposed, and two buckling mechanisms 100 at the back end of the seat base 1 are symmetrically disposed. More specifically, a fastening plate 103 that extends vertically is provided on the seat base 1, and each buckling mechanism 100 is correspondingly disposed on the fastening plate 103. The following uses one of the buckling mechanisms 100 as an example to describe a specific structure thereof in detail.

Figure 4:
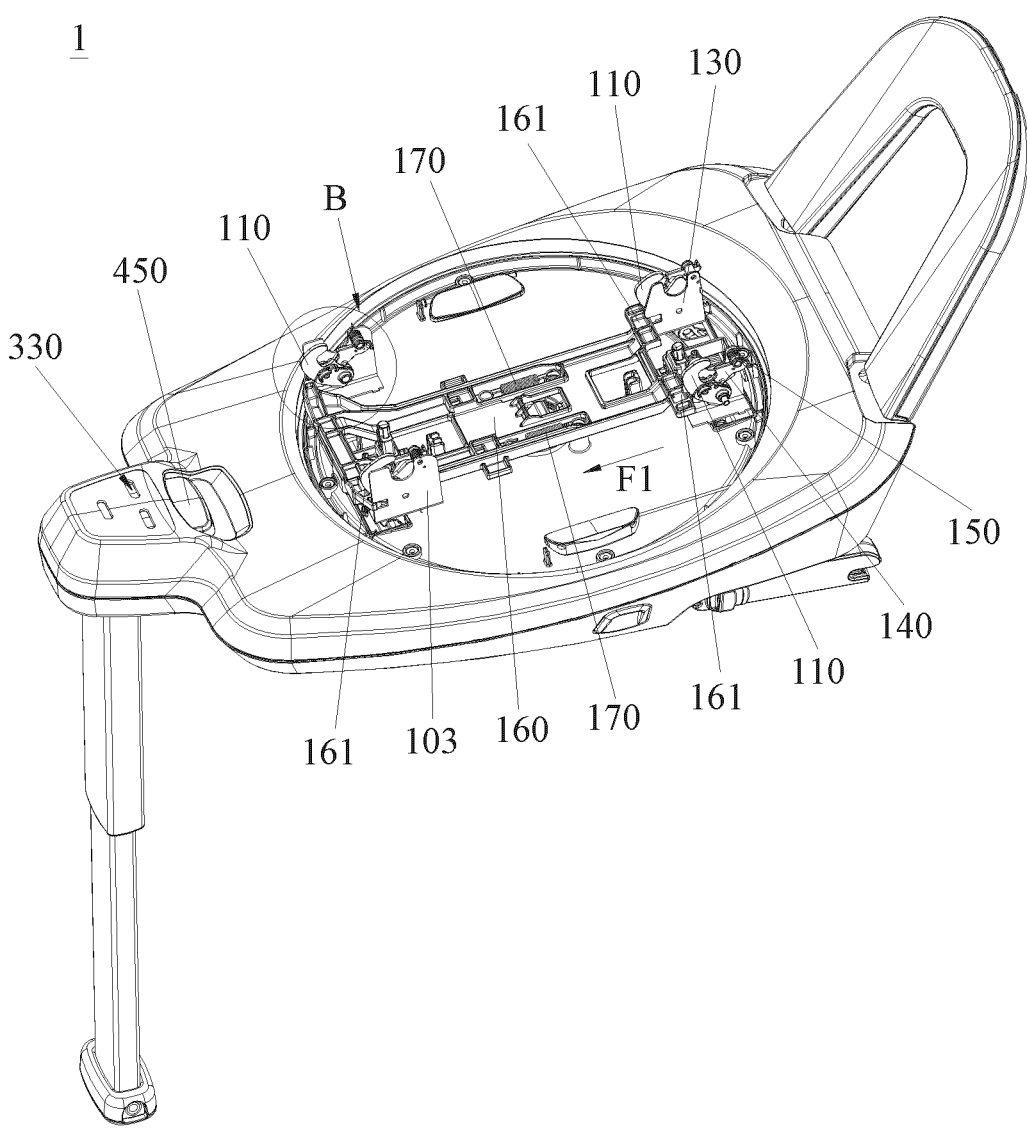
FIG. 4 is a perspective view illustrating an internal structure of FIG. 1.
Figure 5:
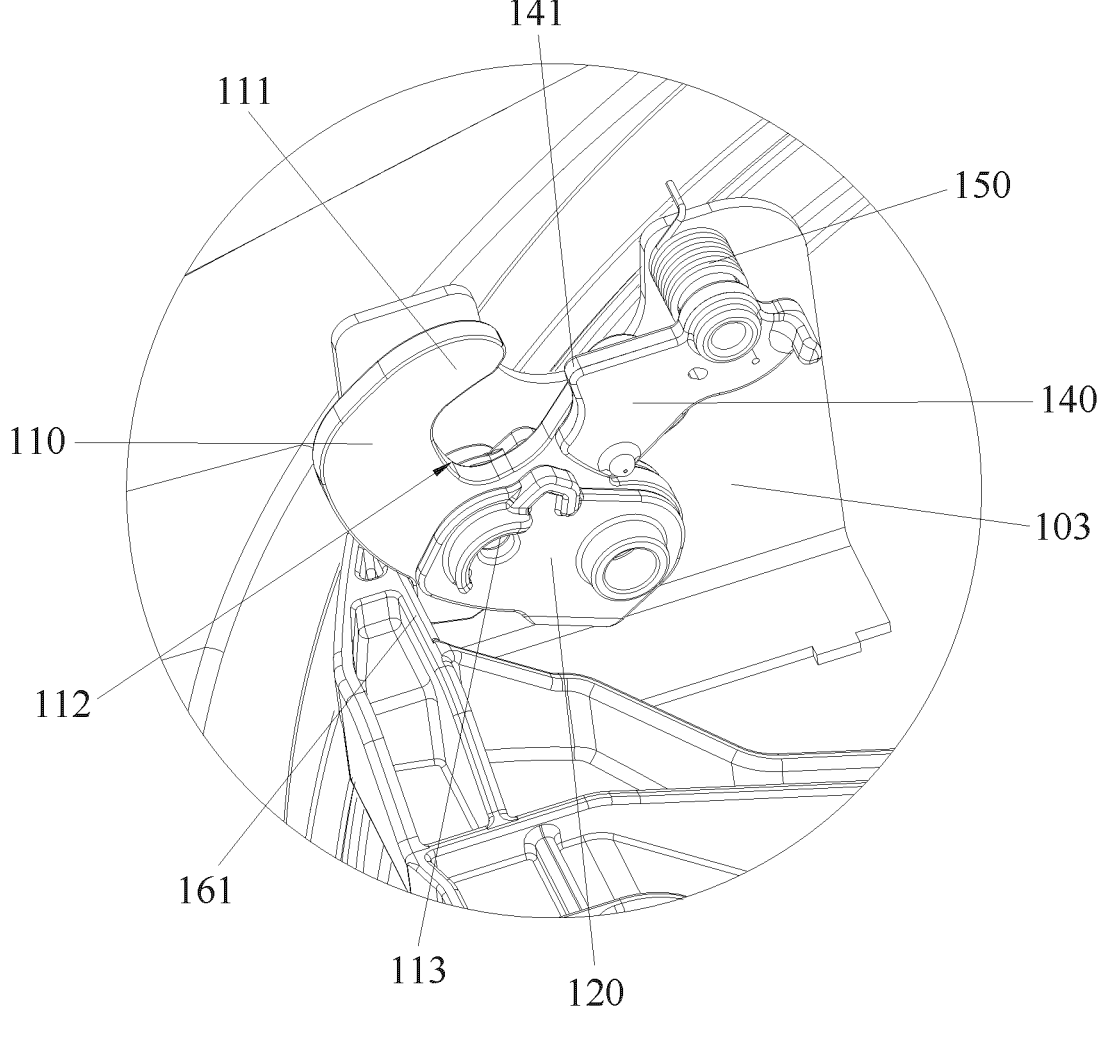
FIG. 5 is an enlarged view of a portion B in FIG. 4.

Referring to FIG. 4 and FIG. 5, the buckling mechanism 100 includes a locking hook 110, a fastening element 120, a fifth restoration element 130, a stopper 140, a sixth restoration element 150, a sliding element 160, and a third restoration element 170.

Specifically, referring to FIG. 2 and FIG. 5, the locking hook 110 is pivotally connected to the fastening plate 103 through a pivoting shaft 113 and has an opened position and a closed position. The locking hook 110 has a hook portion 111, which protrudes into the buckling groove 102, and a locking groove 112 is provided below the hook portion 111. When the locking hook 110 is in the closed position, the buckling rod 201 (referring to FIG. 3) may be restricted in the locking groove 112. When the locking hook 110 is in the opened position, the buckling rod 201 may be detached from the locking groove 112.

Figure 13:
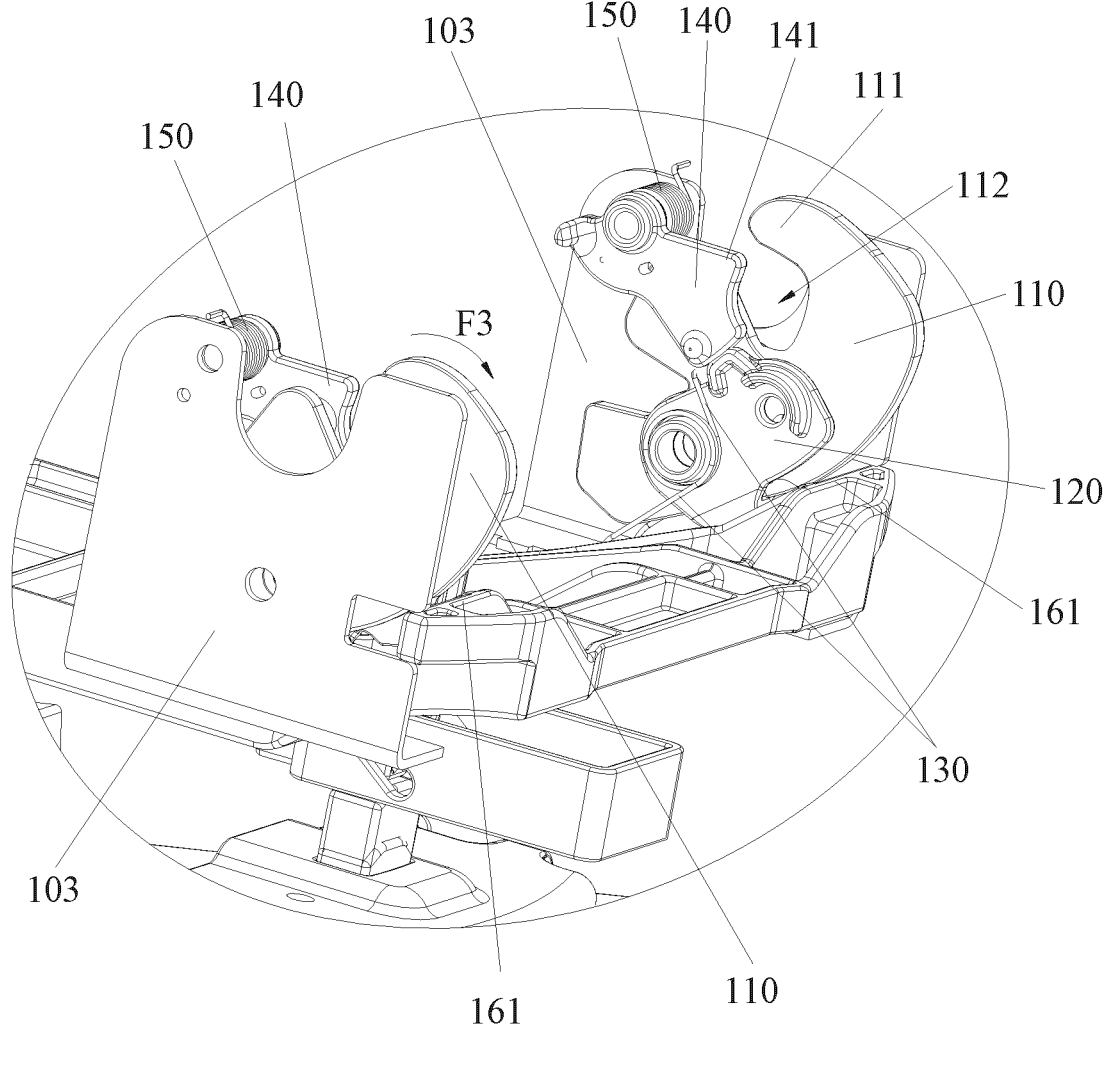
FIG. 13 is an enlarged view of a portion F in FIG. 10.

Specifically, referring to FIG. 5 and FIG. 13, the fastening element 120 is pivotally connected to a side of the locking hook 110 away from the fastening plate 103 through the pivoting shaft 113. The fifth restoration element 130 abuts against each of the fastening element 120 and the locking hook 110. The fifth restoration element 130 constantly enables the locking hook 110 to rotate towards the opened position.

Specifically, referring to FIG. 2 and FIG. 5, one end of the stopper 140 is pivotally connected to the fastening plate 103, and a pivoting shaft of the stopper 140 is parallel to the pivoting shaft 113 of the locking hook 110. The other end of the stopper 140 protrudes towards the fastening element 120 and is pivotally connected to the locking hook 110, and the stopper 140 may abut against the fastening element 120. The sixth restoration element 150 is mounted on the rotating shaft of the stopper 140, both ends of the sixth restoration element 150 respectively abut against the fastening plate 103 and the stopper 140, and the sixth restoration element 150 constantly enables the locking hook 110 to rotate to the opened position. More specifically, the stopper 140 has a protruding portion 141 protruding towards the locking hook 110, and the protruding portion 141 protrudes into the buckling groove 102.

Figure 8:
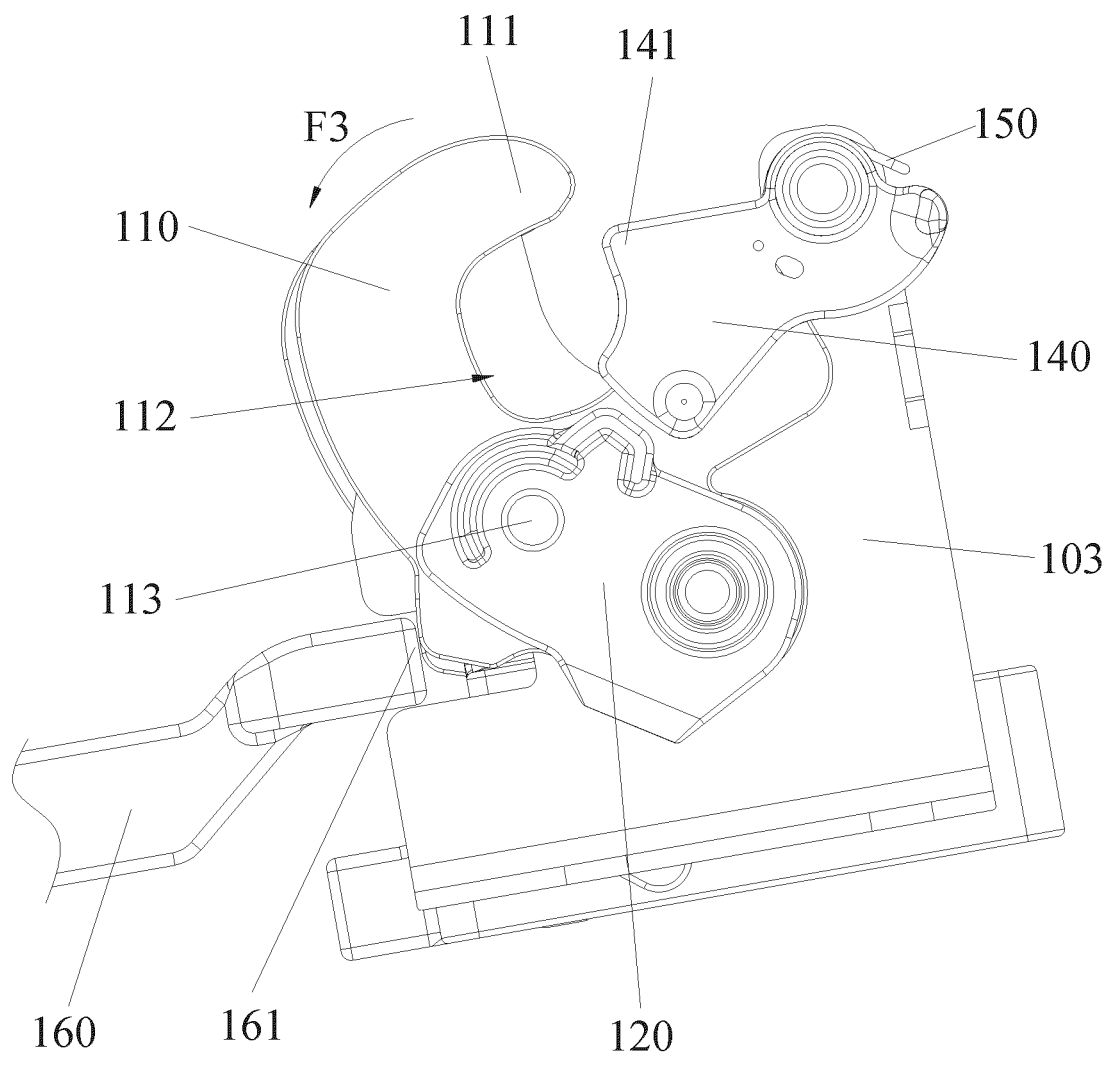
FIG. 8 is an enlarged view of a buckling mechanism of a seat base in FIG. 6.

Referring to FIG. 2, FIG. 5, and FIG. 8, during a process of moving the buckling rod 201 into the buckling groove 102, the buckling rod 201 pushes the hook portion 111, so that the locking hook 110 overcomes the elastic force of the fifth restoration element 130 to rotate, therefore the hook portion 111 rotates to be above the buckling rod 201. Meanwhile, the buckling rod 201 further pushes the protruding portion 141 of the stopper 140 during the buckling process, so as to overcome the elastic force of the sixth restoration element 150 to pivotally rotate towards the fastening element 120. In this process, the stopper 140 drives an end of the locking hook 110 connected to the stopper 140 to move, so as to further drive the locking hook 110 to pivotally rotate to the closed position. The locking hook 110 may be quickly buckled into the buckling rod 201 under the double force, so that the buckling rod 201 is buckled into the locking hook 110 more quickly and effortlessly, and the seat body 2 is mounted and locked quickly. Besides, when the locking hook 110 is in the closed position, the stopper 140 abuts against the fastening element 120 to maintain stable locking of the locking hook 110.

Correspondingly, during a process in which the locking hook 110 pivotally rotates to the opened position, the stopper 140 is restored under the action of the sixth restoration element 150. In other words, the stopper 140 pivotally rotates upwards and no longer abuts against the fastening element 120, and drives the end of the locking hook 110 connected to the stopper 140 to move, so as to generate a force that drives the locking hook 110 to pivotally rotate towards the opened position. Under the joint action of the fifth restoration element 130 and the sixth restoration element 150, the locking hook 110 may be quickly opened, the buckling rod 201 is detached more easily and quickly, and the seat body 2 is detached quickly.

Specifically, the sliding element 160 is movably disposed in the mounting base 101, and the sliding element 160 may abut against the four locking hooks 110, thus ensuring that the four locking hooks 110 simultaneously maintain in the opened position or the closed position, referring to FIG. 4 and FIG. 5.

Referring to FIG. 4, FIG. 10 to FIG. 13, and FIG. 23 to FIG. 26, the sliding element 160 is substantially rectangular in shape. The blocking portions 161 are respectively disposed at four corners of the sliding element 160, and each of the four blocking portions 161 correspondingly abuts against each locking hook 110. The sliding element 160 has a locking position and an unlocking position. When the sliding element 160 is in the locking position, the four blocking portions 161 of the sliding element 160 simultaneously maintain the four locking hooks 110 in the closed position. When the sliding element 160 slides to the unlocking position along a direction indicated by an arrow F1, the four locking hooks 110 may pivotally rotate to the opened position, and then the four blocking portions 161 may abut against the locking hooks 110 again to maintain the locking hooks 110 in the opened position. One sliding element 160 simultaneously drives the four locking hooks 110 to synchronously implement locking and unlocking to simplify the structure. One end of the third restoration element 170 is fastened to the sliding element 160, and the other end of the third restoration element 170 is fastened to the mounting base 101. The third restoration element 170 constantly enables the sliding element 160 to slide towards the locking position, and the elastic force of the third restoration element 170 ensures that the sliding element 160 constantly has the force for pressing against the locking hook 110, so that the sliding element 160 may maintain the locking hook 110 in the closed position or the opened position.

Figure 9:
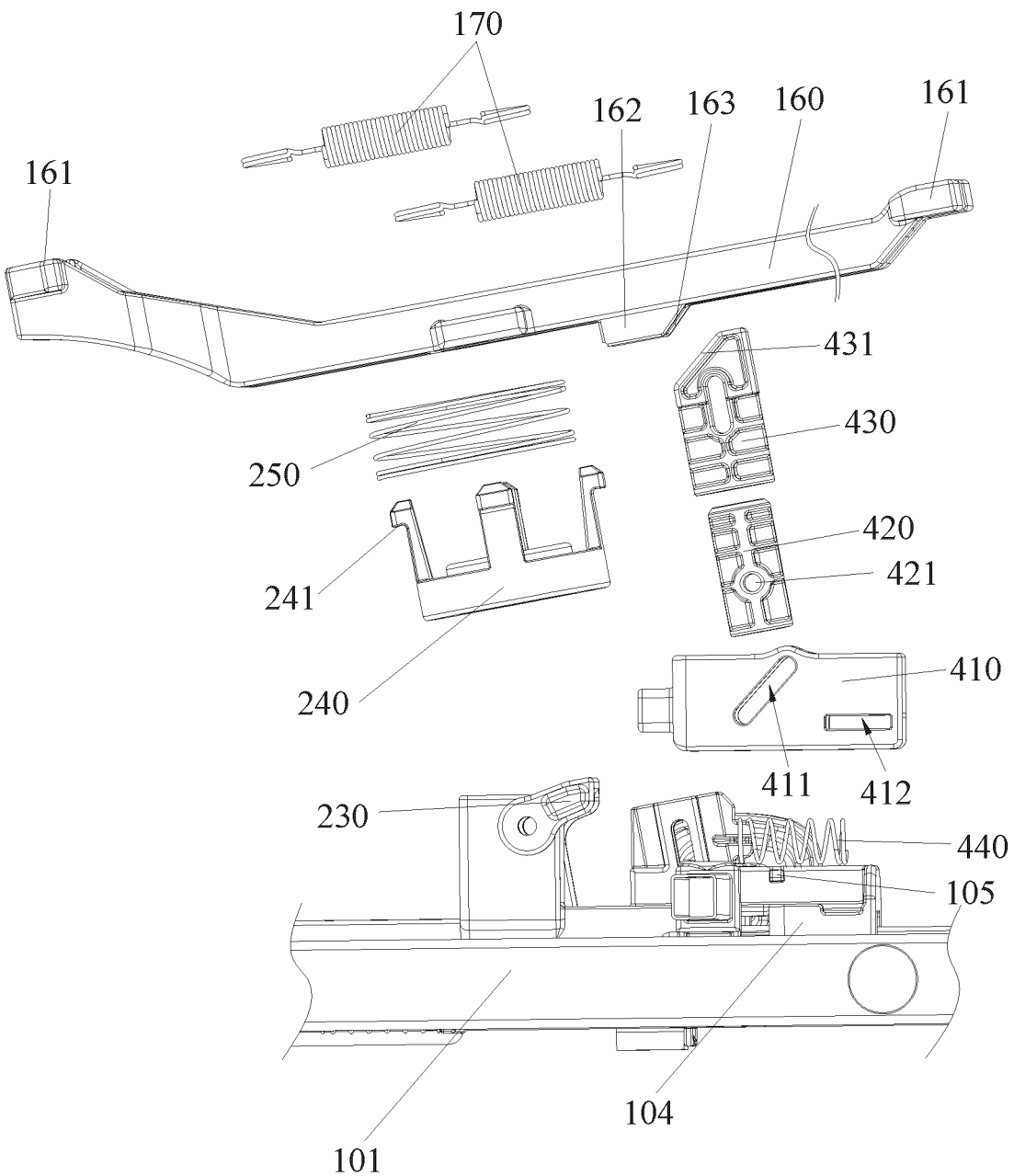
FIG. 9 is an exploded view of an unlocking mechanism of a seat base in FIG. 6.

Referring to FIG. 4 and FIG. 9, the third restoration element 170 may be a tension spring, but is not limited hereto, and other elastic components may be selected. In the illustrated embodiment, there are two third restoration elements 170, which are disposed at intervals. A front end of each third restoration element 170 is connected to the sliding element 160, and a rear end of the third restoration element 170 is connected to the mounting base 101. The third restoration element 170 has a constant force that pulls the sliding element 160 towards a rear end of the mounting base 101, that is, the third restoration element 170 constantly enables the sliding element 160 to move towards the rear end of the mounting base 101 along a direction reverse to the direction indicated by the arrow F1 in FIG. 4 and FIG. 10. Therefore, the blocking portions 161 respectively abut against front sides of the locking hooks 110. It should be understood that, in another embodiment, referring to FIG. 23 to FIG. 26, the sliding element 160 may alternatively abut against a rear side of the locking hook 110. In this case, the third restoration element 170 exerts a reverse force on the sliding element 160.

Referring to FIG. 1 to FIG. 5, FIG. 8, FIG. 12, and FIG. 13, after the buckling rod 201 pushes downwards the hook portion 111 of the locking hook 110 to drive the hook portion 111 to pivotally rotate, the hook portion 111 of the locking hook 110 pivotally rotates to a position above the buckling rod 201, that is, the locking hook 110 rotates to the closed position. In this process, the locking hook 110 enables the fifth restoration element 130 to be deformed. When the locking hook 110 is in the closed position, because the sliding element 160 abuts against a lower end of the locking hook 110, the locking hook 110 maintains in the closed position. When the sliding element 160 slides to the unlocking position along the direction indicated by the arrow F1, the locking hook 110 loses the force from the sliding element 160, and the fifth restoration element 130 restores from deformation and drives the locking hook 110 to automatically pivotally rotate to the opened position along a direction indicated by an arrow F3 in FIG. 12 and FIG. 13. In this way, the buckling rod 201 is unlocked from the locking hook 110, thus allowing the buckling rod 201 to move out of the buckling groove 102 of the locking hook 110 and allowing the seat body 2 to be detached from the seat base 1. As for the locking hook 110 in the opened position, the sliding element 160 abuts against the lower end of the locking hook 110 again under the force of the third restoration element 170, so that the locking hook 110 maintains in the opened position and cannot be closed.

In the illustrated embodiment, the sliding element 160 moves to drive the linkage mechanism 200 to act, so that the indication mechanism 300 changes the indication state.

Specifically, referring to FIG. 6, FIG. 7, FIG. 10, and FIG. 11, the linkage mechanism 200 includes a linkage element 210, a first restoration element 220, a rotation element 230, a push button 240, and a second restoration element 250.

Figure 6:
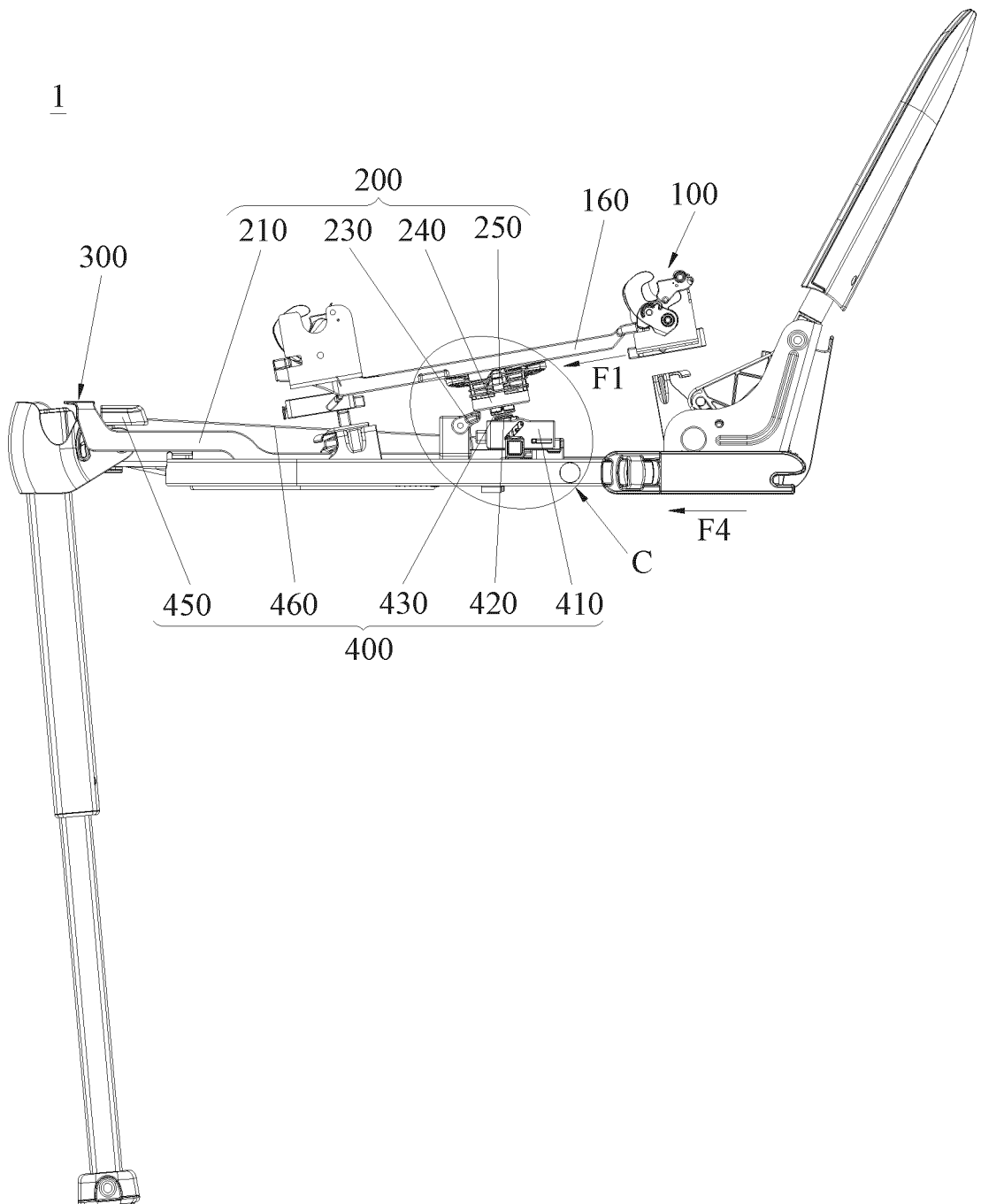
FIG. 6 is a side view illustrating another internal structure of FIG. 1.
Figure 7:
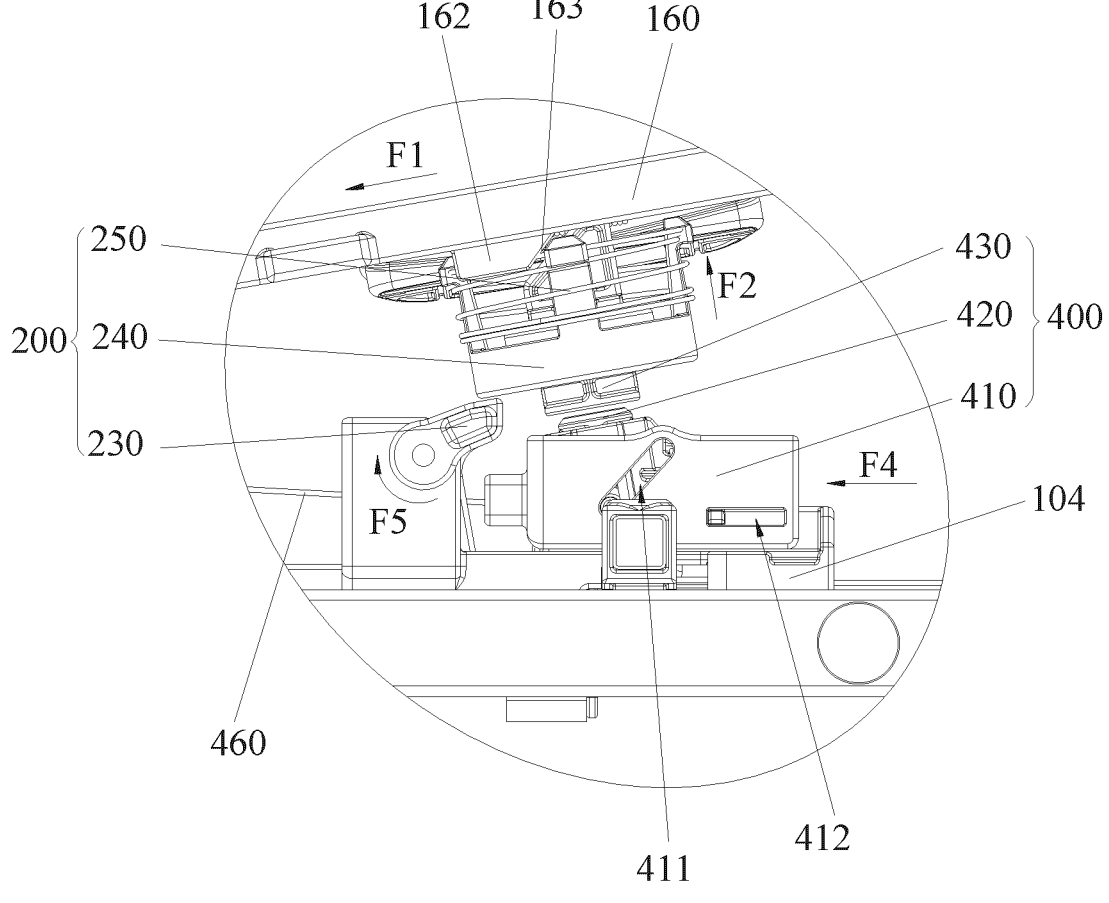
FIG. 7 is an enlarged view of a portion C in FIG. 6.
Figure 10:
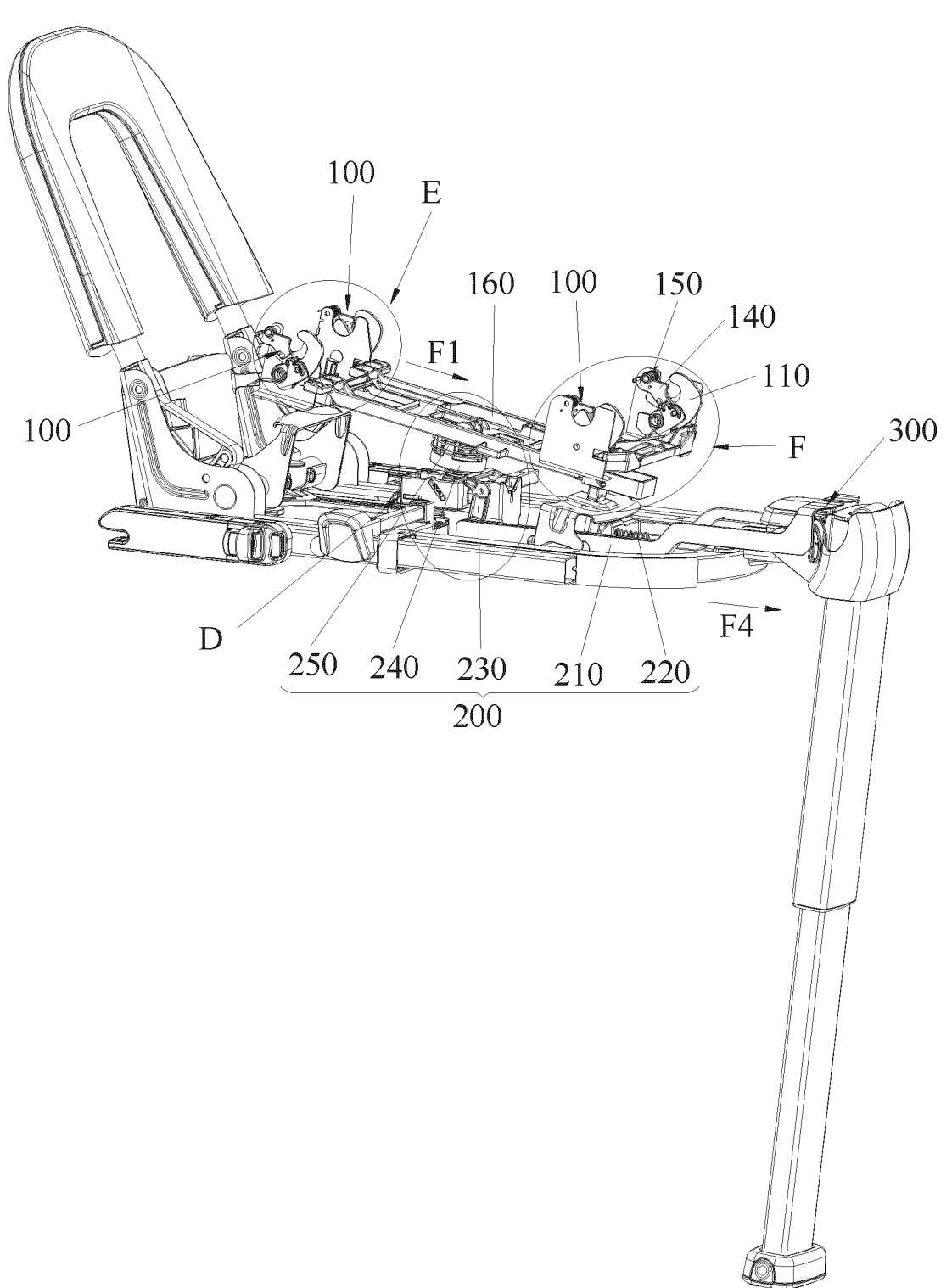
FIG. 10 is a perspective view of still another internal structure of FIG. 1.
Figure 11:
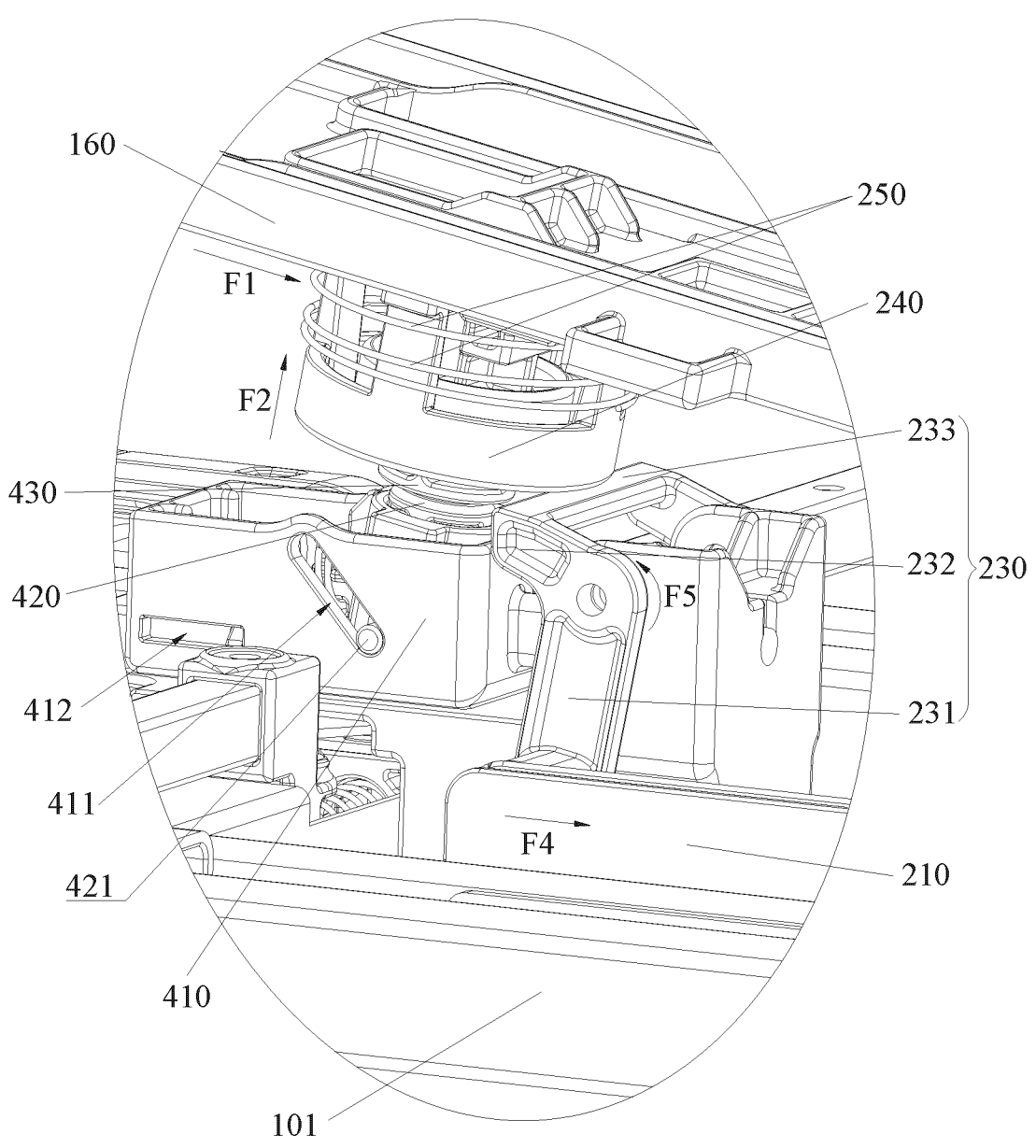
FIG. 11 is an enlarged view of a portion D in FIG. 10.
Figure 12:
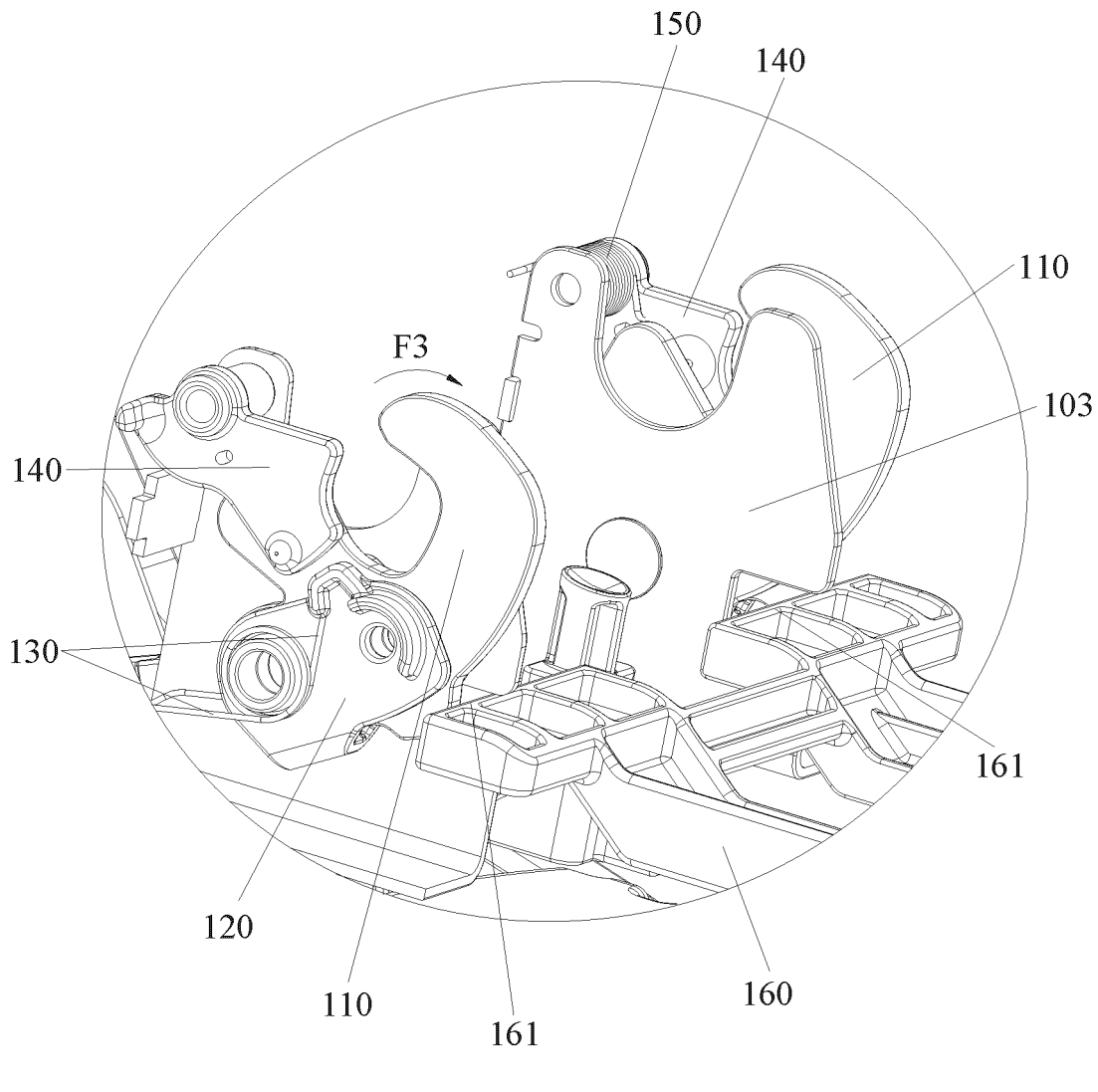
FIG. 12 is an enlarged view of a portion E in FIG. 10.

Referring to FIG. 6, FIG. 7, and FIG. 11, the linkage element 210 is movably mounted in the mounting base 101, and one end of the linkage element 210 is connected to an indication area. The linkage element 210 has a first indication position and a second indication position that are opposite to each other. When the linkage element 210 is in different indication positions, the indication area is in different indication states. The first restoration element 220 is disposed between the linkage element 210 and the mounting base 101, and the first restoration element 220 constantly enables the linkage element 210 to move towards the second indication position, referring to FIG. 10 and FIG. 16.

Referring to FIG. 9, FIG. 10, FIG. 11, and FIG. 17, the rotation element 230 is a substantially L-shaped sheet, and a middle portion of the rotation element 230 is pivotally connected to the mounting base 101. The rotation element 230 has a first connecting end 231 and a second connecting end 232, and the first connecting end 231 and the second connecting end 232 form an angle relative to a pivoting shaft of the rotation element 230. The first connecting end 231 is pivotally connected to the linkage element 210, and the second connecting end 232 has an abutting portion 233 that extends vertically, that is, the abutting portion 233 extends along the axial direction of the pivoting shaft of the rotation element 230. The abutting portion 233 is located below the push button 240 and abuts against the push button 240. When the push button 240 acts on the abutting portion 233, the rotation element 230 may be driven to rotate. In addition, the sliding element 160 has a push protrusion 162 protruding downwardly, and the push protrusion 162 is in a slidable cooperation with an upper end of the push button 240. When the sliding element 160 slides, the push protrusion 162 pushes the push button 240 to slide downwardly, that is, slide along a direction reverse to a direction indicated by an arrow F2 shown in FIG. 11.

Figure 15:
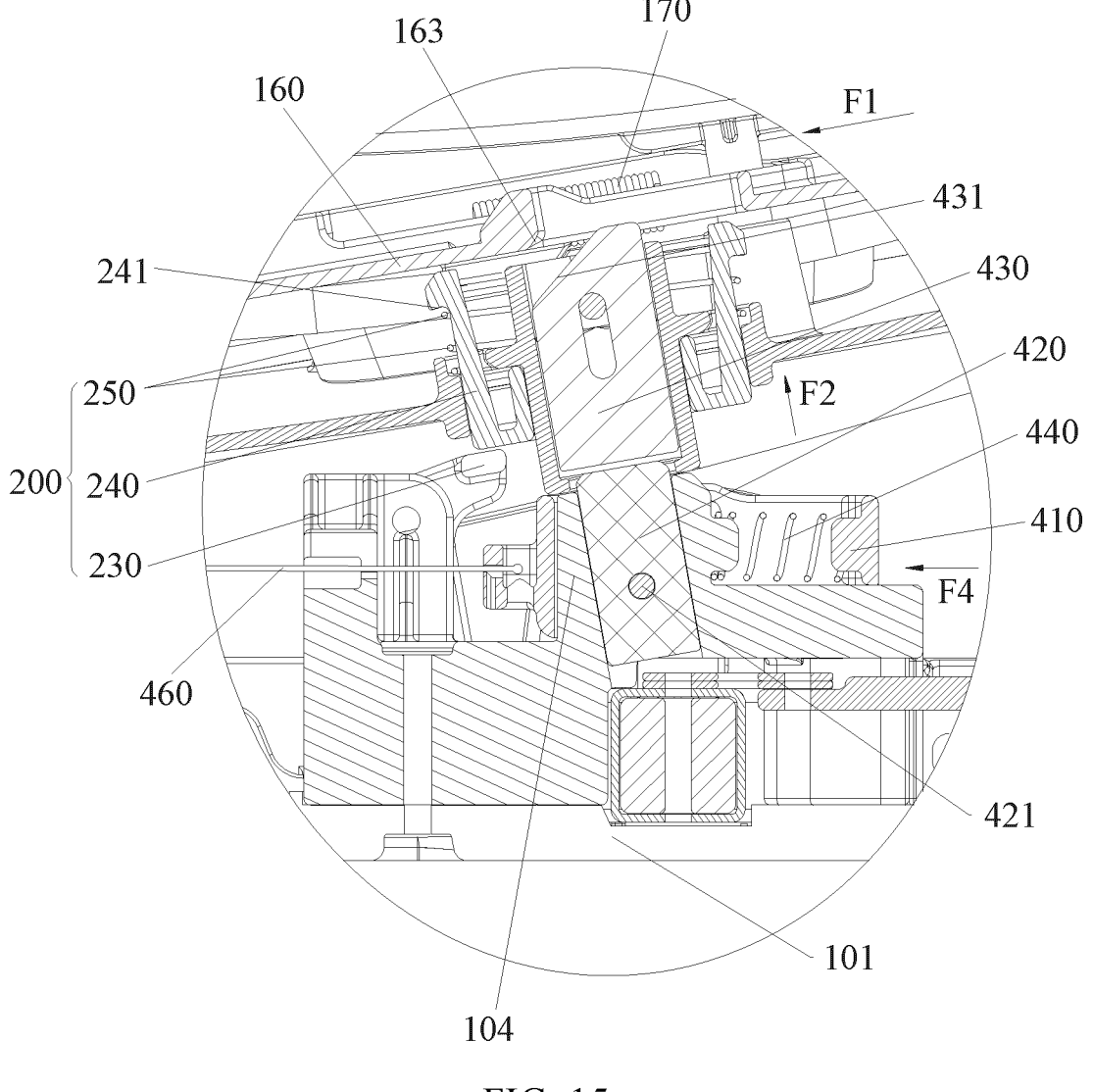
FIG. 15 is an enlarged view of a portion G in FIG. 14.

Referring to FIG. 9, FIG. 11, and FIG. 15, the upper end of the push button 240 has a protrusion block 241 protruding along the radial direction of the push button 240, and the second restoration element 250 is sleeved on the push button 240 and abuts against the mounting base 101 and the protrusion block 241, respectively. The second restoration element 250 constantly enables the push button 240 to move towards a direction reverse to a direction in which the push button 240 is pushed by the buckling mechanism 100.

Figure 16:
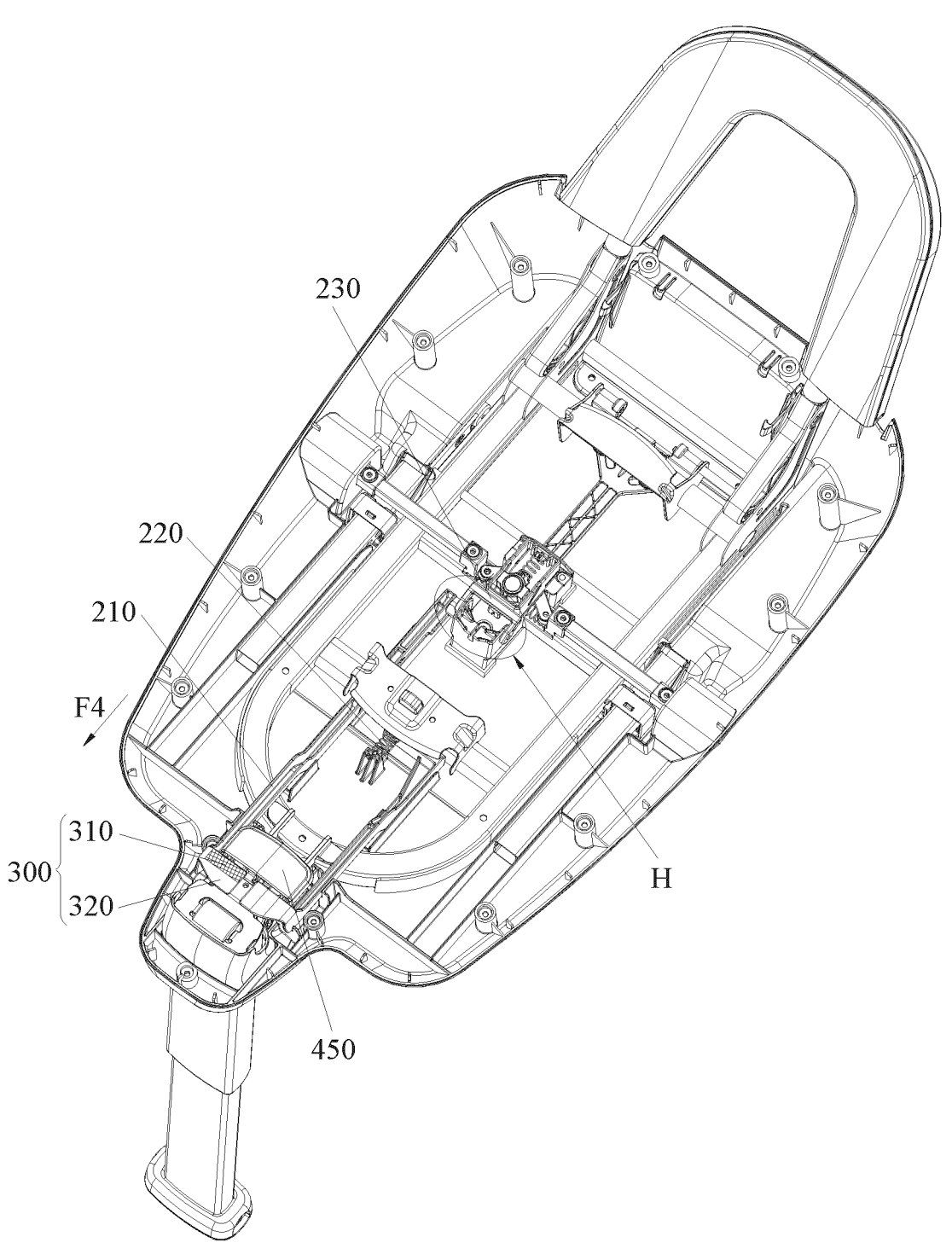
FIG. 16 is a perspective view of yet another internal structure of FIG. 1.
Figure 17:
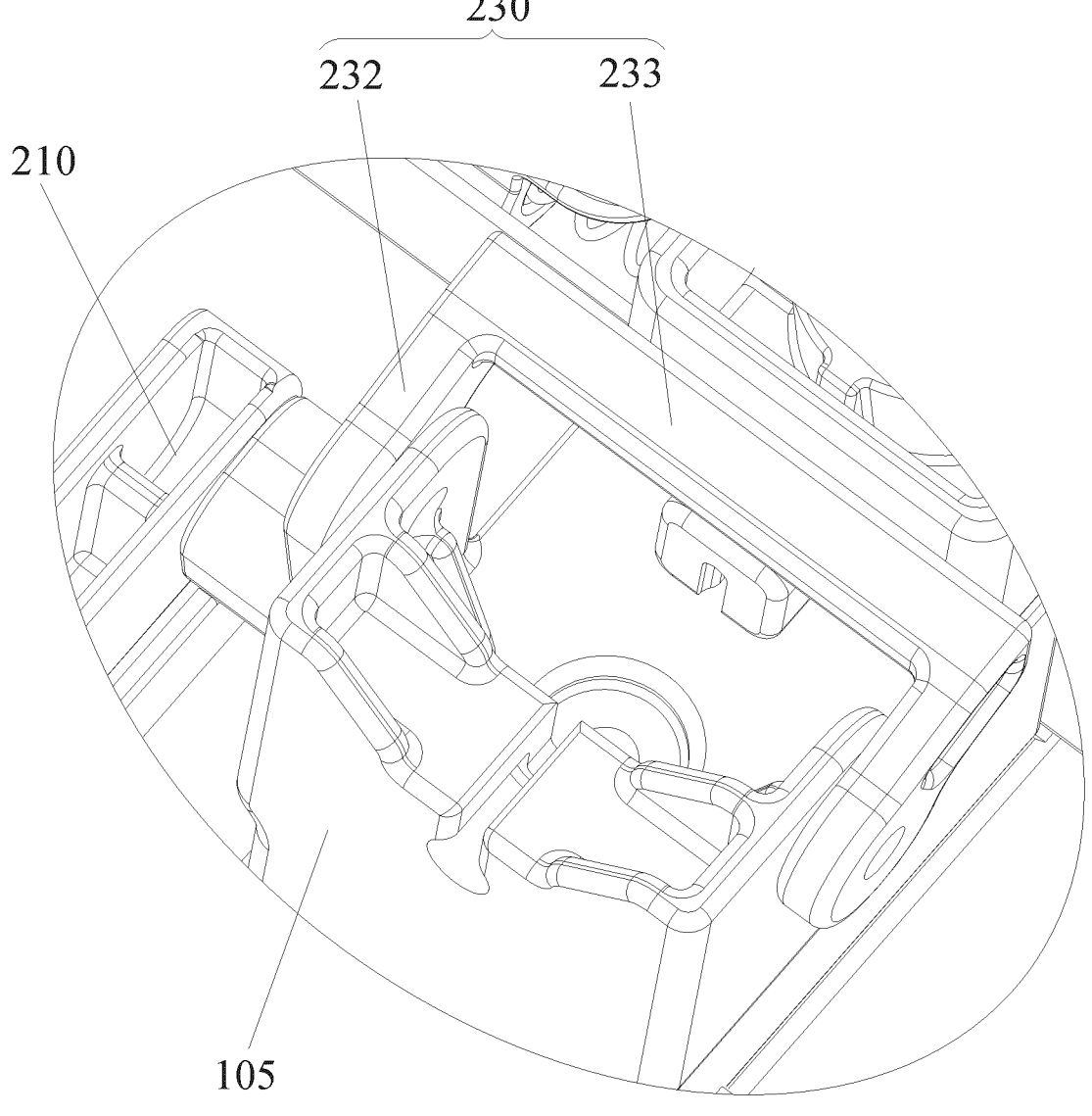
FIG. 17 is an enlarged view of a portion H in FIG. 16.

With reference to FIG. 1, FIG. 16, and FIG. 17, indication areas of the indication mechanism 300 includes a first indication area 310 and a second indication area 320, both of which are located at an end of the linkage element 210 away from the rotation element 230. The first indication area 310 and the second indication area 320 may be presented in different colors, patterns, or other warning signs. For example, in this embodiment, the first indication area 310 is painted in green and the second indication area 320 is painted in red, which can clearly indicate the state of the locking hook 110.

Besides, referring to FIG. 1 and FIG. 4, the indication mechanism 300 further includes an indication window 330 provided at the front end of the mounting base 101, and the first indication area 310 and the second indication area 320 are provided below the indication window 330. When the linkage element 210 moves, the first indication area 310 and the second indication area 320 selectively face the indication window 330, that is, the indication area is switched between the first indication state and the second indication state. The first indication area 310 corresponds to the first indication state, and the second indication area 320 corresponds to the second indication state.

Figure 14:
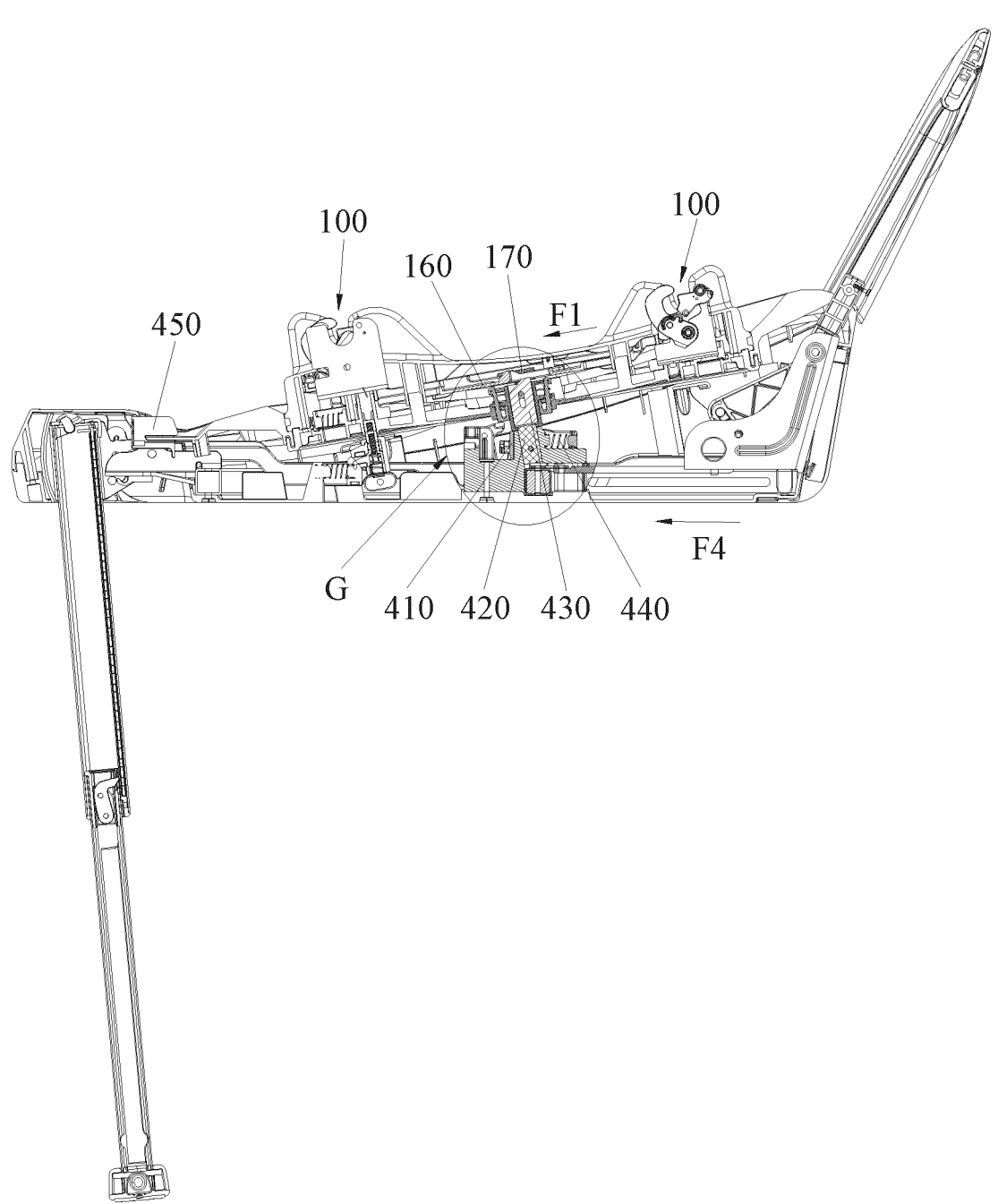
FIG. 14 is a cross-sectional view of FIG. 1.

With reference to FIG. 10, FIG. 11, FIG. 16, and FIG. 17, during a process in which the seat base 1 is buckled into the seat body 2, the sliding element 160 moves in a direction reverse to the direction indicated by the arrow F1 shown in FIG. 10 and FIG. 14. The push protrusion 162 on the sliding element 160 presses the push button 240 downwardly, so that the push button 240 moves downwardly, that is, along the direction reverse to the direction indicated by the arrow F2 in FIG. 11 and FIG. 15. In this process, the second restoration element 250 is deformed by compressing. The push button 240 pushes the abutting portion 233 of the rotation element 230 in a process of moving downwards, so that the rotation element 230 pivotally rotates around the pivoting shaft of the rotation element 230 along a direction indicated by an arrow F5 in FIG. 7 and FIG. 11. Therefore, the first connecting end 231 of the rotation element 230 swings to drive the linkage element 210 to slide along a direction indicated by an arrow F4 in FIG. 10 and FIG. 11. During this process, the linkage element 210 pushes and deforms the first restoration element 220. When the seat body 2 is fully buckled into the seat base 1, the locking hook 110 pivotally rotates to the closed position, the sliding element 160 is in the locking position to maintain the push button 240 in a low position, and the linkage element 210 slides to the first indication position. In other words, the first indication area 310 (a green area) is aligned with the indication window 330, that is, the indication area is in the first indication state, indicating that the seat body 2 is fully buckled into the seat base 1.

When the seat body 2 is unbuckled from the seat base 1, the locking hook 110 is unlocked. When the sliding element 160 moves to the direction indicated by the arrow F1 in FIG. 10, the push protrusion 162 on the sliding element 160 is detached from the push button 240, and the push button 240 slides upwards along the direction indicated by the arrow F2 in FIG. 11 under the force of the second restoration element 250. At the same time, the first restoration element 220 restores from deformation to act on the linkage element 210 to drive the linkage element 210 to slide along a direction reverse to the direction indicated by the arrow F4 in FIG. 10 and FIG. 11. When the linkage element 210 slides to the second indication position, the second indication area 320 (a red area) is aligned with the indication window 330, that is, the indication state of the indication area is driven to switch to the second indication state, indicating that the seat base 1 is not connected to the seat body 2.

In an embodiment, referring to FIG. 4, FIG. 6 to FIG. 11, FIG. 14, and FIG. 15, the unlocking mechanism 400 includes a drive element 410, a first mandrel 420, a second mandrel 430, a fourth restoration element 440, a handle 450, and a pulling element 460.

Referring to FIG. 4, FIG. 6 to FIG. 11, FIG. 14, and FIG. 15, the drive element 410 may be movably mounted on the mounting base 101 and has a first position and a second position that are opposite to each other. The first mandrel 420 is movably disposed and is in slidable cooperation with the drive element 410. A movement direction of the first mandrel 420 intersects that of the drive element 410. The second mandrel 430 is inserted in the push button 240 and is movably disposed. Both ends of the second mandrel 430 respectively abut against the first mandrel 420 and the sliding element 160, and the first mandrel 420 drives the second mandrel 430 to move in the same direction. When the drive element 410 moves under a force along the direction indicated by the arrow F4 shown in in FIG. 7, FIG. 10, FIG. 11, FIG. 14, and FIG. 15, the first mandrel 420 may be driven to move along the direction indicated by the arrow F2 to push the second mandrel 430 to move along the direction indicated by the arrow F2, to drive the sliding element 160 to move along the direction indicated by the arrow F1 to no longer abut against the locking hook 110, so that the locking hook 110 may pivotally rotate to the opened position.

Referring to FIG. 7 and FIG. 9, the drive element 410 is provided with a drive chute 411 and a sliding groove 412 that intersect with each other. The sliding groove 412 extends along a sliding direction thereof. A mounting block 104 is disposed on the mounting base 101. A third guide rod

105 is disposed on the mounting block 104, and the third guide rod 105 may be inserted into the sliding groove 412 and may slide along the sliding groove 412, so that the drive element 410 is slidably connected to the mounting block 104. The first mandrel 420 is slidably connected in the mounting block 104. A first guide rod 421 is disposed on the first mandrel 420, and the first guide rod 421 is inserted into the drive chute 411 and may slide along the drive chute 411, so that the first mandrel 420 is slidably connected to the drive element 410. When the drive element 410 slides from the first position to the second position along the direction indicated by the arrow F4 shown in FIG. 7, FIG. 10, FIG. 11, FIG. 14, and FIG. 15, the drive chute 411 acts on the first guide rod 421 to drive the first mandrel 420 to move upwards along the direction indicated by the arrow F2. The fourth restoration element 440 is disposed between the drive element 410 and the mounting block 104. During a process in which the drive element 410 slides to the second position, the fourth restoration element 440 is compressed, so that the fourth restoration element 440 constantly enables the drive element 410 to move towards the first position.

Referring to FIG. 9 and FIG. 15, the second mandrel 430 is slidably connected to the mounting base 101 through a pin element, and a driving slope 431 is provided at an end of the second mandrel 430 away from the first mandrel 420. A driven slope 163 that cooperates with the driving slope 431 is disposed substantially in the middle of the sliding element 160. When the second mandrel 430 moves upwards along the direction indicated by the arrow F2, the driving slope 431 acts on the driven slope 163 to drive the sliding element 160 to move along the direction indicated by the arrow F1.

Referring to FIG. 1, FIG. 4, FIG. 6, and FIG. 7, the handle 450 is disposed at the front end of the seat base 1 adjacent to the indication mechanism 300 and is exposed on the upper surface of the seat base 1, so as to facilitate user's operation. The pulling element 460 is connected between the handle 450 and the drive element 410. When the handle 450 is operated, the pulling element 460 pulls the drive element 410 to slide from the first position to the second position. The pulling element 460 may be a steel wire rope, but is not limited hereto, and may also be another similar component with desirable toughness and strength.

With reference to FIG. 4, FIG. 6 to FIG. 11, FIG. 14, and FIG. 15, when the drive element 410 is in the first position, the first mandrel 420 is retracted into the drive element 410, referring to FIG. 7, FIG. 11, and FIG. 15, and the fourth restoration element 440 is in a natural state. In this case, the sliding element 160 is in the locking position and the locking hook 110 maintains in the closed position. When the handle 450 is pulled, the handle 450 will pull, through the pulling element 460, the drive element 410 to slide along the direction indicated by the arrow F4 shown in FIG. 7, FIG. 10, FIG. 11, FIG. 14, and FIG. 15. In this process, the drive element 410 acts on and deforms the fourth restoration element 440. In a process in which the drive element 410 slides, the drive chute 411 drives the first mandrel 420 to slide upwards along the direction indicated by the arrow F2, and the first mandrel 420 then pushes the second mandrel 430 to slide upwards along the direction indicated by the arrow F2. The driving slope 431 on the second mandrel 430 acts on the driven slope 163 to drive the sliding element 160 to move along the direction indicated by the arrow F1, until the sliding element 160 moves to the unlocking position. During the sliding process of the sliding element 160, the third restoration element 170 is further stretched. When the sliding element 160 moves to the unlocking position, the locking hook 110 may automatically pivotally rotate and open under the action of the fifth restoration element 130.

After the handle 450 is released, the drive element 410 restores to the first position under the action of the fourth restoration element 440, so as to drive the first mandrel 420 to slide downwards in the direction reverse to the direction indicated by the arrow F2, so that the second mandrel 430 also slides downwards along this direction. The sliding element 160 loses the force of the second mandrel 430, and therefore restores under the action of the third restoration element 170, thereby pressing against the locking hook 110 again to maintain the locking hook 110 in the opened position.

In another embodiment, referring to FIG. 22 to FIG. 34, the unlocking mechanism 400 includes a first pivoting element 410*a*, a first push element 420*a*, a second push element 430*a*, a second pivoting element 440*a*, a seventh restoration element 450*a*, a handle 450, and a pulling element 460.

Figure 27:
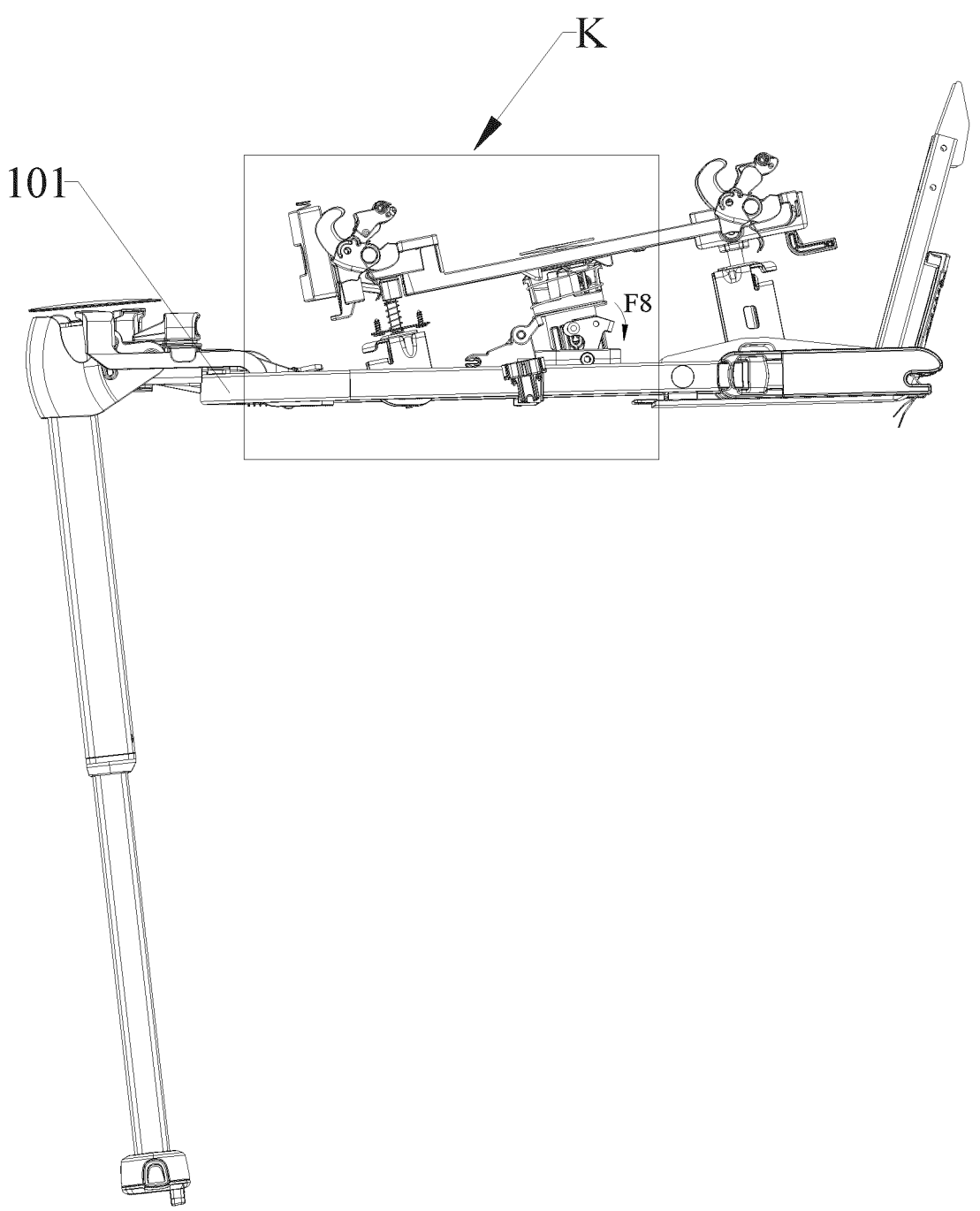
FIG. 27 is a side view of an internal structure of FIG. 23.
Figure 28:
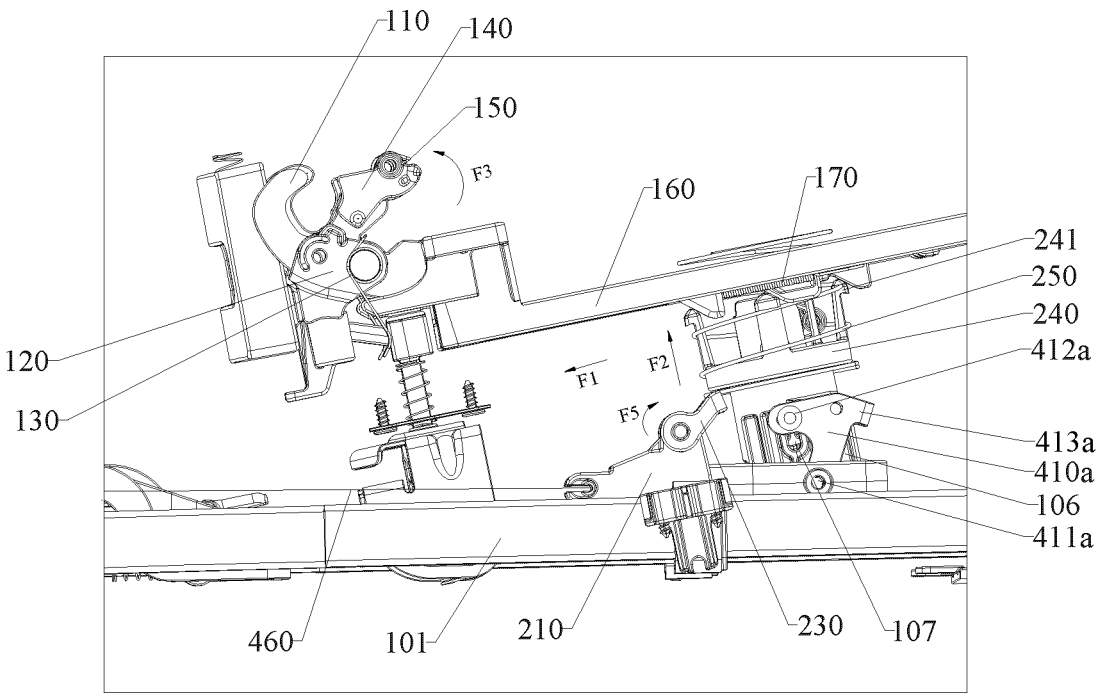
FIG. 28 is an enlarged view of a portion K of FIG. 27.
Figure 29:
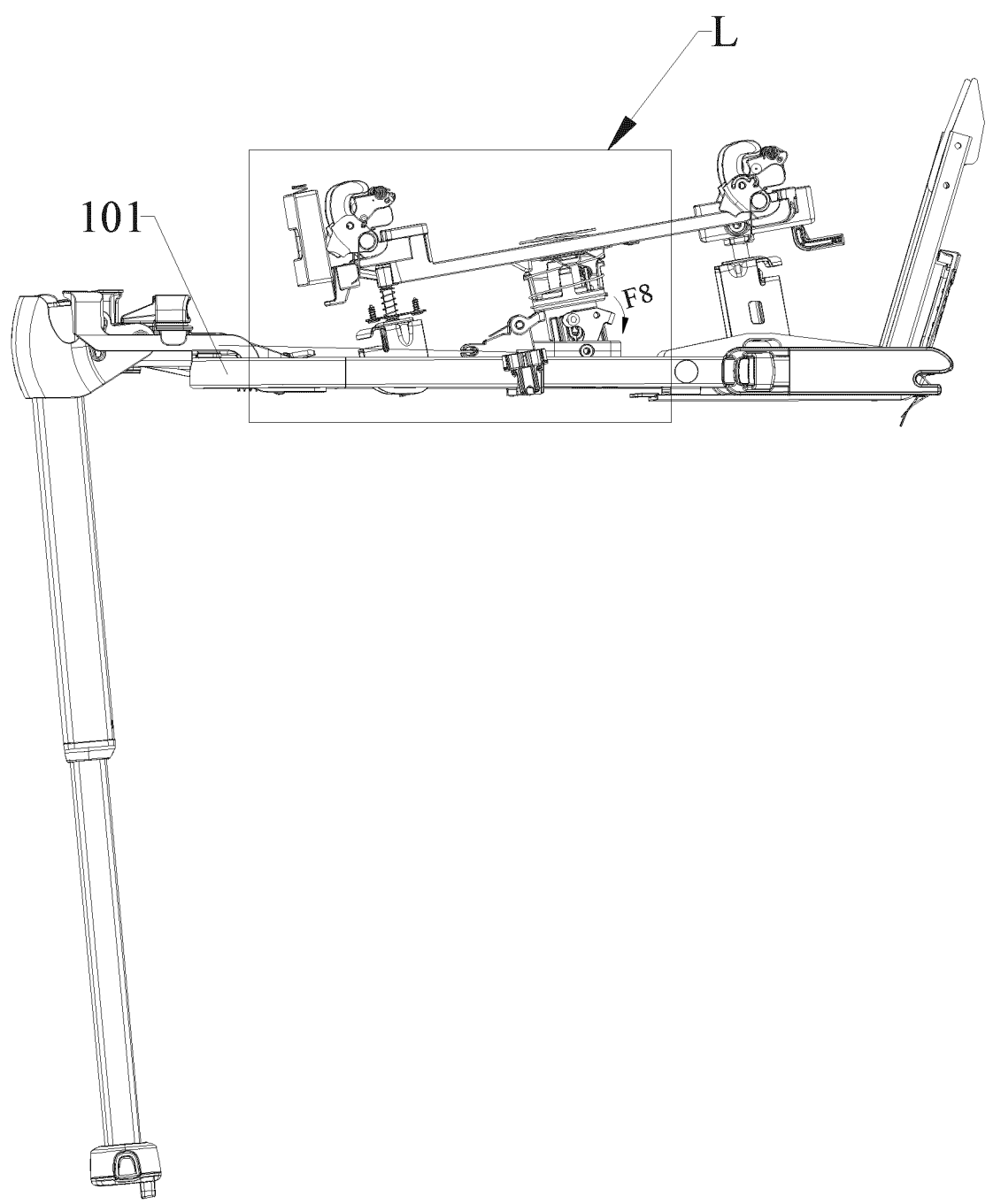
FIG. 29 is a side view of an internal structure of FIG. 25.
Figure 30:
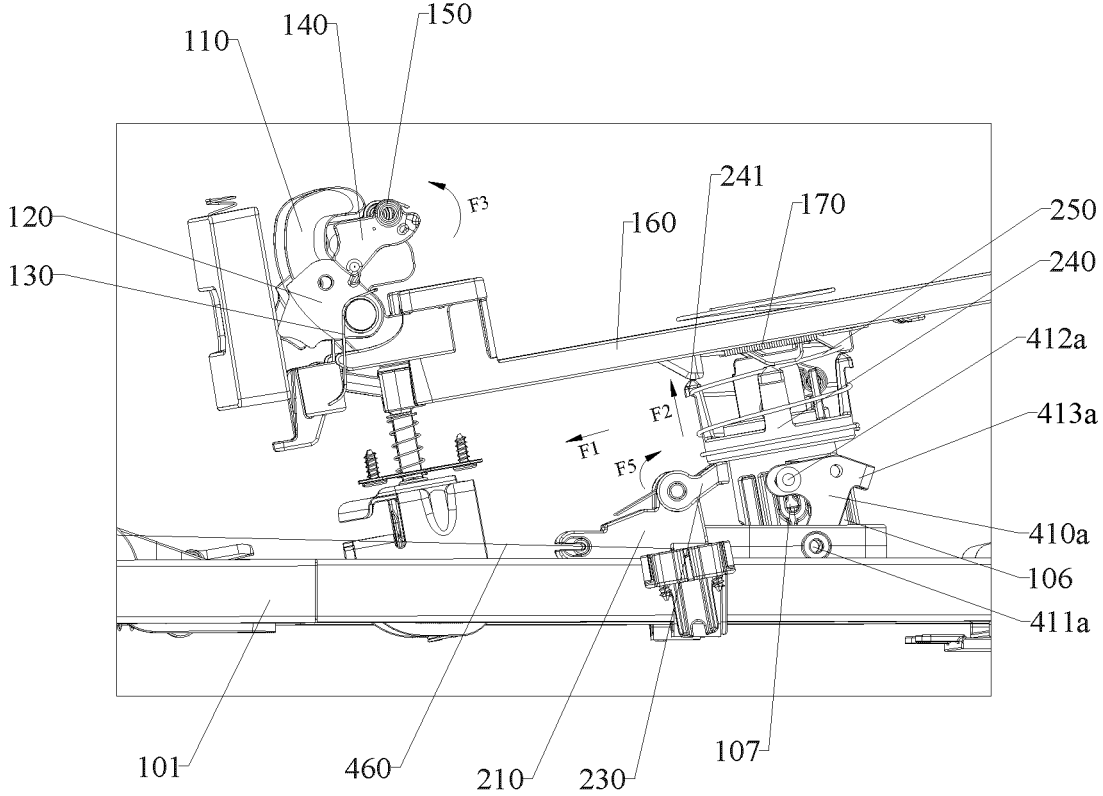
FIG. 30 is an enlarged view of a portion L of FIG. 29.
Figure 31:
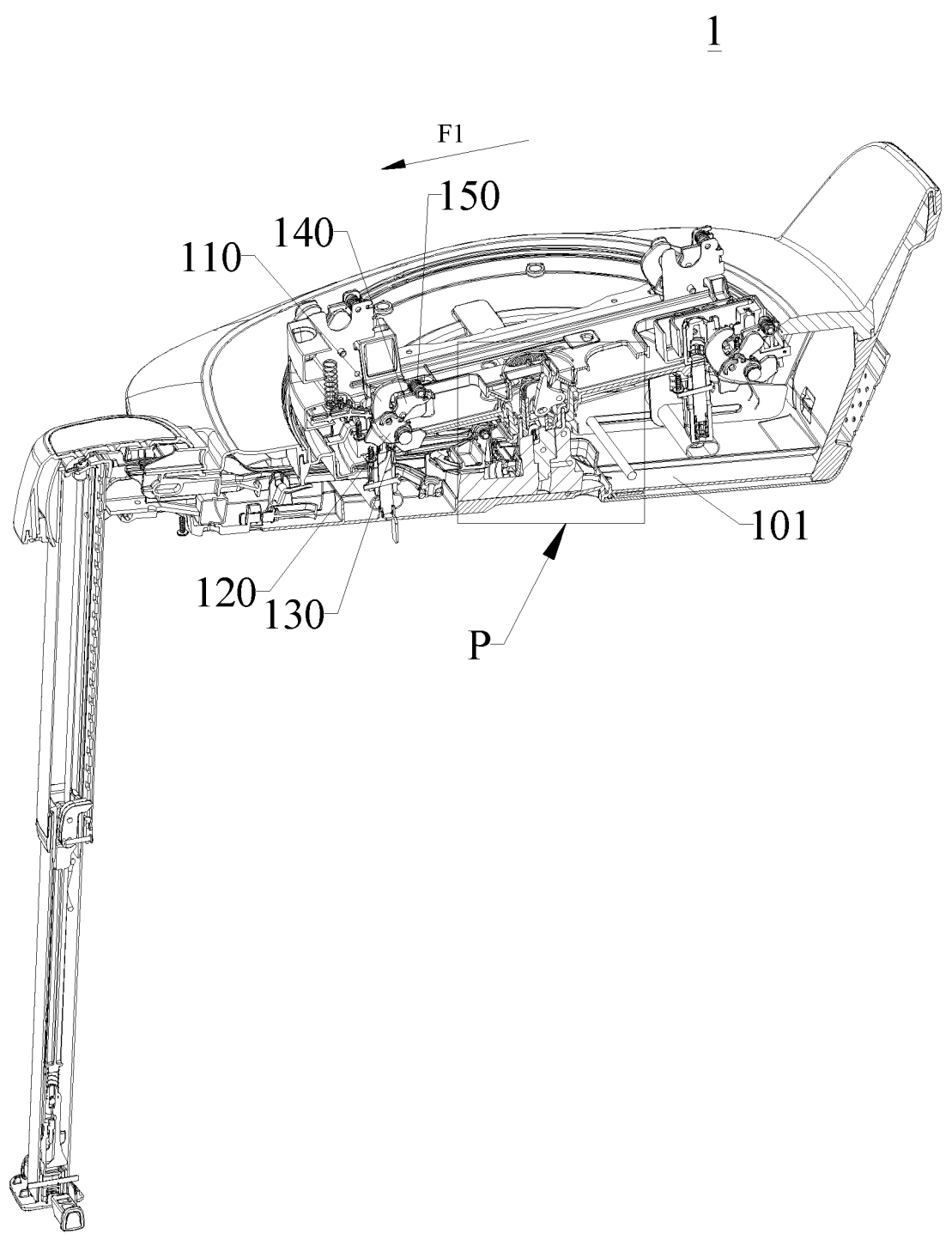
FIG. 31 is a cross-sectional view of FIG. 20, where a sliding element is in a locking position.

Specifically, the first pivoting element 410*a* is a substantially triangle sheet, and positions of three vertices of the first pivoting element 410*a* respectively have a first pivoting end 411*a*, a drive end 412*a*, and a free end 413*a*, referring to FIG. 28 and FIG. 30. The first pivoting end 411*a* is pivotally connected to the mounting base 101 and is connected to one end of the pulling element 460, and the first pivoting element 410*a* may rotate to a third position or a fourth position with the first pivoting end 411*a* as the center. A mounting cylinder 106 is disposed on the mounting base 101, and the mounting cylinder 106 is provided with a drive guide groove 107 along a direction F2 in FIG. 28 and FIG. 30. The first push element 420*a* is substantially cylindrical in shape and is slidably disposed in the mounting cylinder 106. A second guide rod 421*a* is disposed on the first push element 420*a*, referring to FIG. 32 and FIG. 34. The second guide rod 421*a* is inserted in the drive guide groove 107 and moves along the drive guide groove 107, so that the first push element 420*a* is slidably connected to the mounting cylinder 106. The second guide rod 421*a* extends through the mounting cylinder 106 from the drive guide groove 107 and is connected to the drive end 412*a*. When the first pivoting element 410*a* rotates from the third position to the fourth position along the direction indicated by an arrow F8 in FIG. 27 and FIG. 29, the drive end 412*a* of the first pivoting element 410*a* moves upwards along the drive guide groove 107 along the direction indicated by the arrow F2. At the same time, the drive guide groove 107 acts on the second guide rod 421*a* to drive the first push element 420*a* to move upwards along the direction indicated by the arrow F2, referring to FIG. 32 and FIG. 34.

Figure 32:
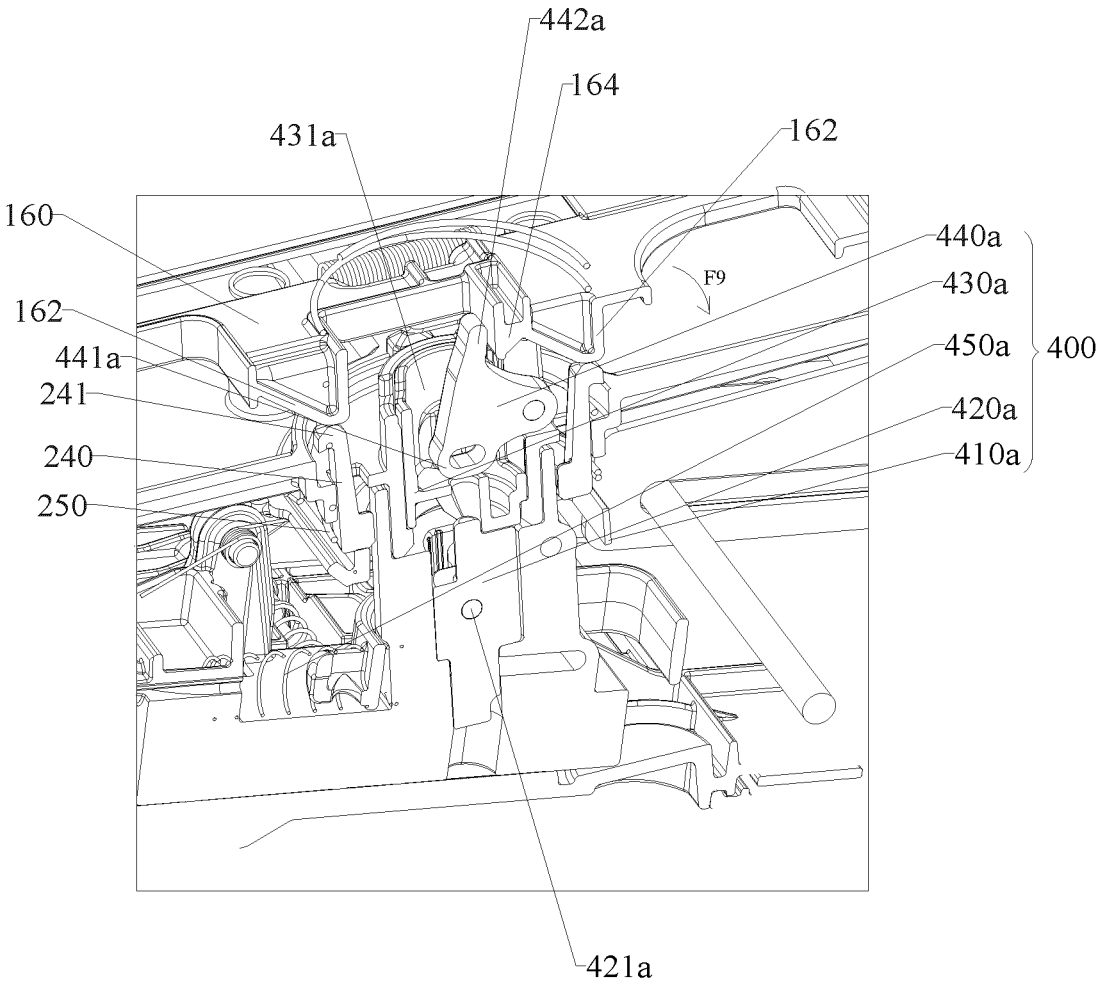
FIG. 32 is an enlarged view of a portion P of FIG. 31.
Figure 33:
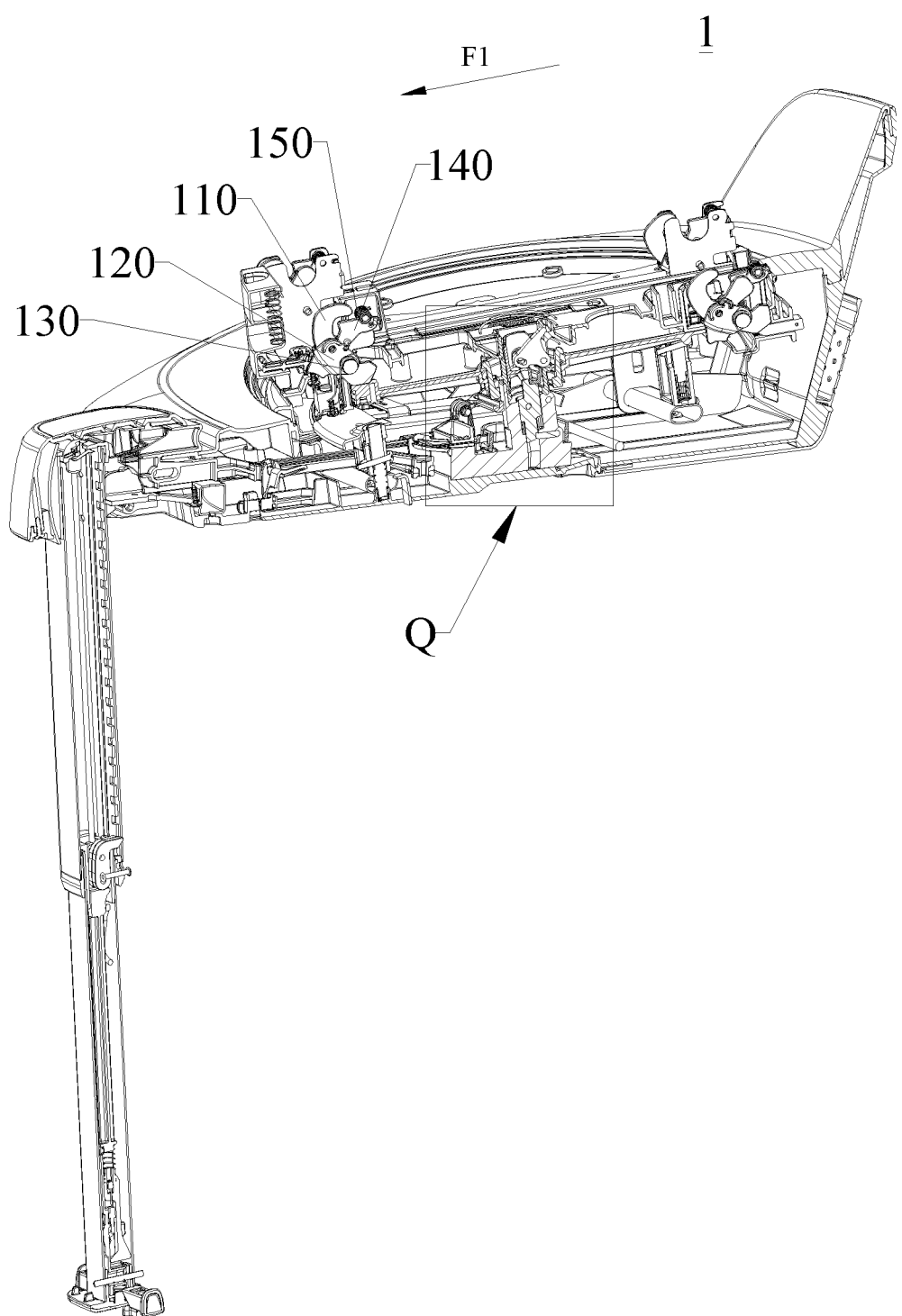
FIG. 33 is another cross-sectional view of FIG. 20, where a sliding element is in an unlocking position.
Figure 34:
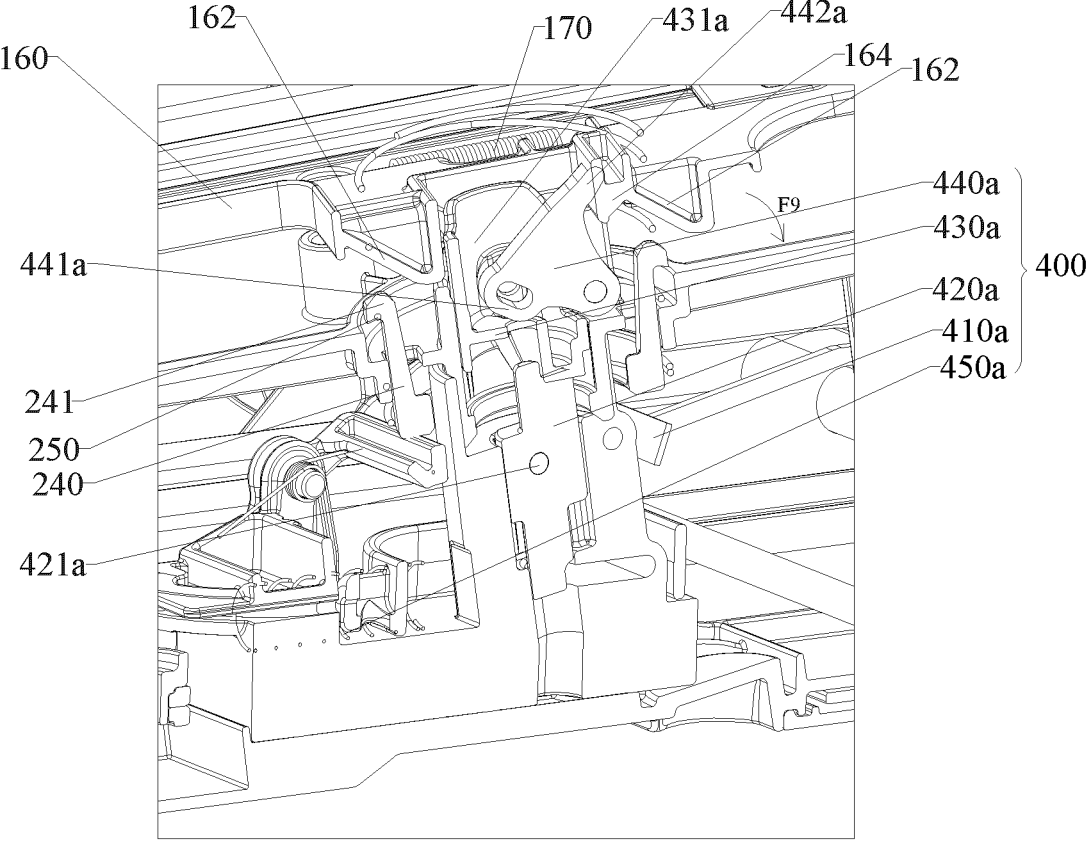
FIG. 34 is an enlarged view of a portion Q of FIG. 33.

Referring to FIG. 32 and FIG. 34, the second push element 430*a* is movably disposed between the first push element 420*a* and the sliding element 160. The second push element 430*a* has a mounting groove 431*a*, and the second pivoting element 440*a* is rotatably disposed in the mounting groove 431*a*. The outside of a bottom wall of the mounting groove 431*a* abuts against the first push element 420*a*. The second pivoting element 440*a* is substantially a triangle sheet structure. Positions of two vertices of the second pivoting element 440*a* respectively have a second pivoting end 441*a* and an abutting end 442*a*, the second pivoting end 441*a* is pivotally connected to a side wall of the mounting groove 431*a*, and the abutting end 442*a* is configured to abut against the sliding element 160. Specifically, an abutting protrusion block 164 may be disposed around the middle position of the sliding element 160, and the abutting end 442*a* is configured to abut against the abutting protrusion block 164. When the first pivoting element 410*a* rotates under a force in the direction indicated by the arrow F8 shown in FIG. 27 and FIG. 29, the first push element 420*a* may be driven to move in the direction indicated by the arrow F2, to push the second push element 430*a* to push second pivoting element 440*a* to rotate in the direction indicated by the arrow F9 shown in FIG. 32 and FIG. 34. In this way, the abutting end 442*a* pushes the pushing protrusion block 164 to drive the sliding element 160 to move in the direction reverse to the direction indicated by the arrow F1, to no longer abut against the locking hook 110, so that the locking hook 110 may pivotally rotate to the open position, referring to FIG. 23 to FIG. 26.

Referring to FIG. 32 and FIG. 34, the seventh restoration element 450*a* abuts against the first pivoting element 410*a* and the mounting base 101, respectively. In a process in which the first pivoting element 410*a* rotates along the direction indicated by the arrow F8 shown in FIG. 27 and FIG. 29, the seventh restoration element 450*a* is compressed. Therefore, the seventh restoration element 450*a* constantly enables the first pivoting element 410*a* to have a tendency of rotating to be restored along the direction reverse to the direction indicated by the arrow F8 shown in FIG. 27 and FIG. 29.

Figure 19:
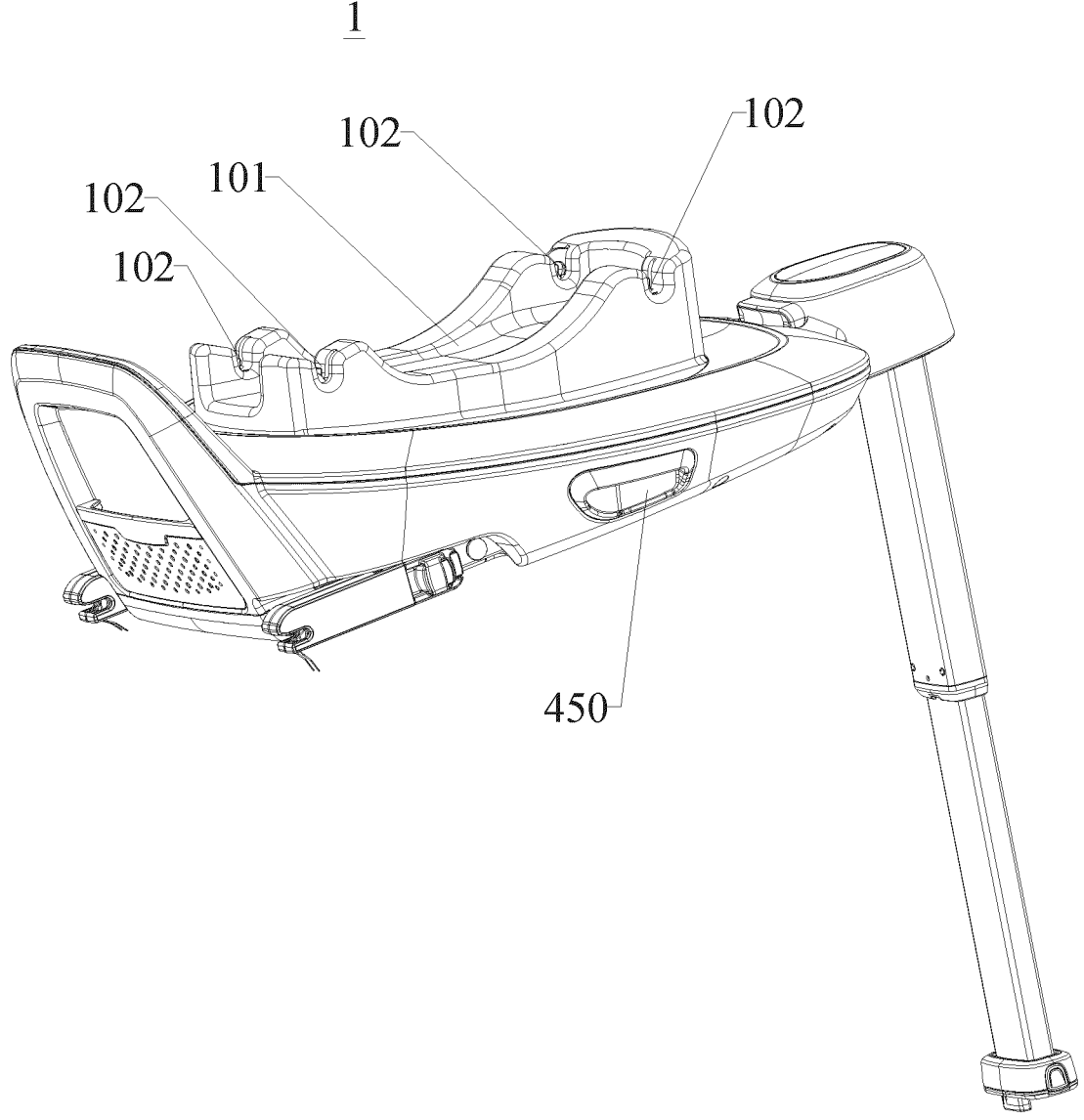
FIG. 19 is a perspective view of a seat base of the child safety seat in FIG. 18.
Figure 20:
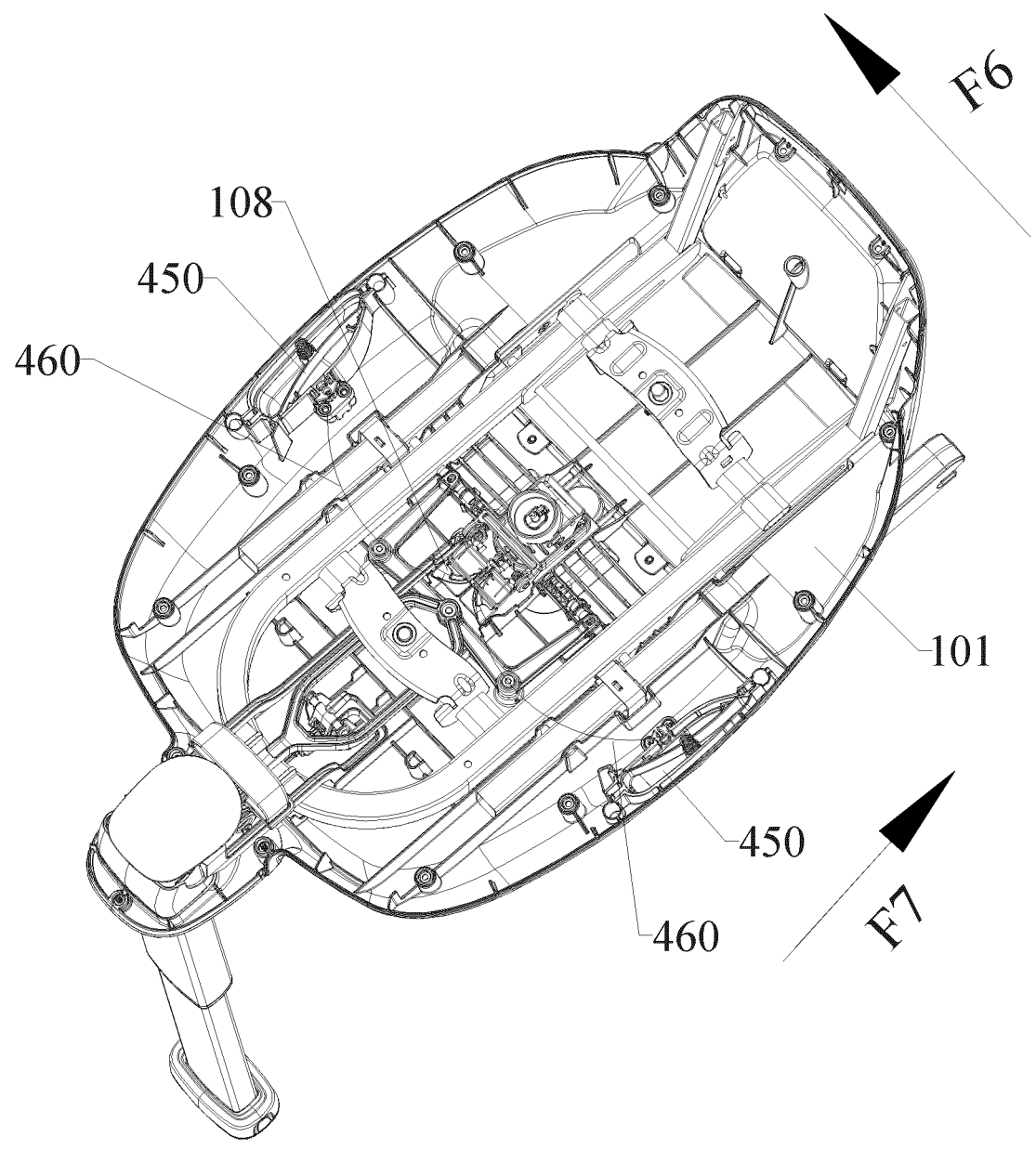
FIG. 20 is a perspective view of an internal structure of FIG. 19.
Figure 21:
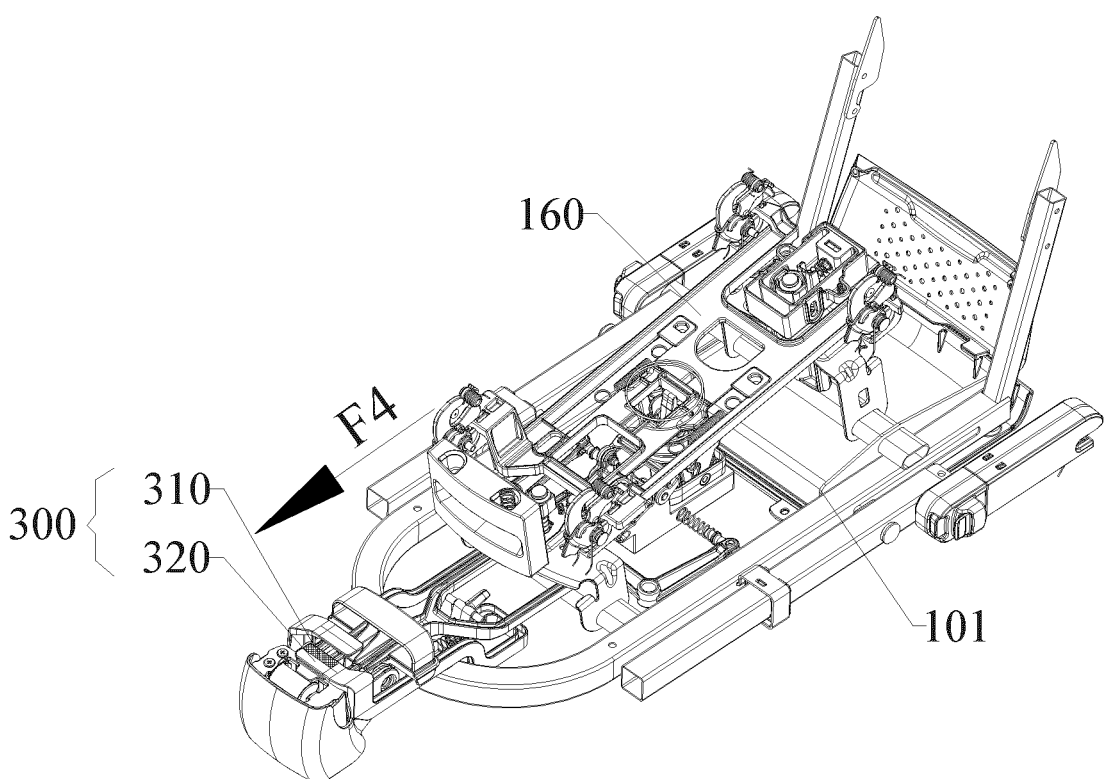
FIG. 21 is a perspective view of a partial structure of FIG. 20.
Figure 22:
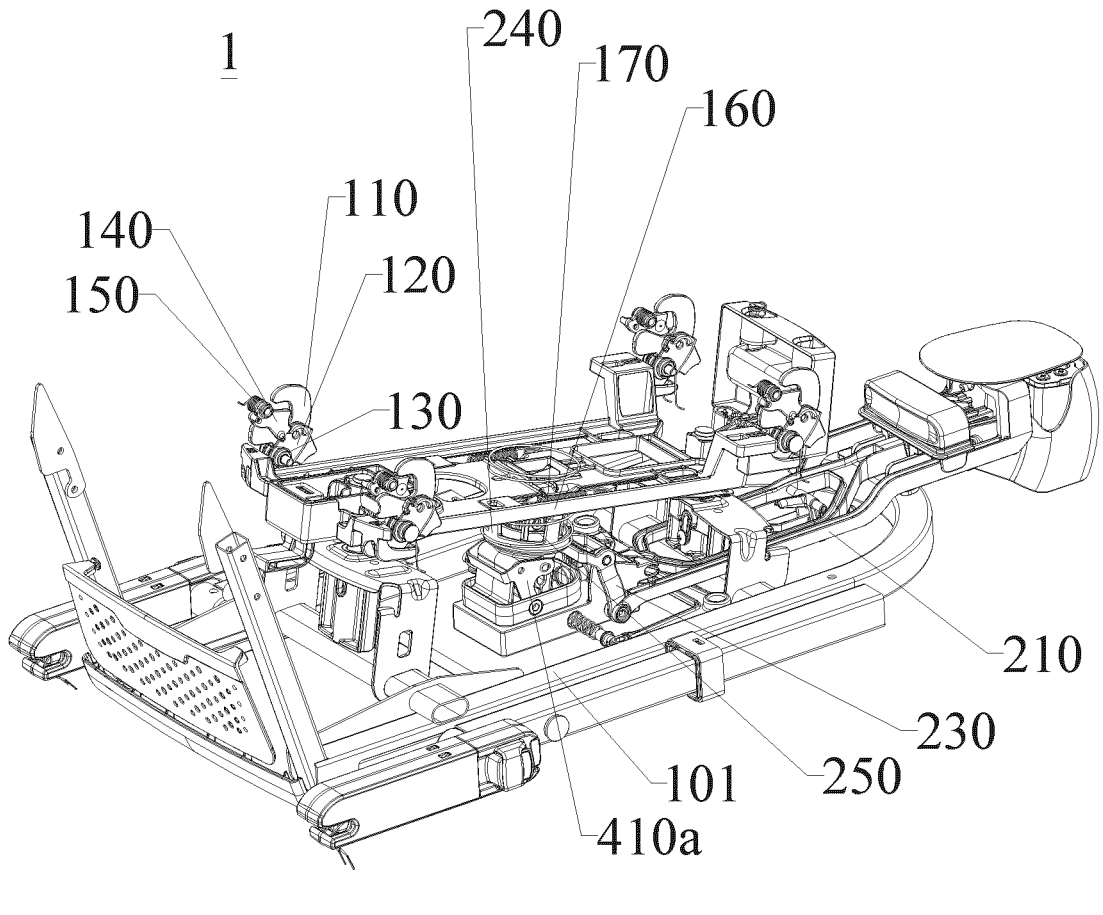
FIG. 22 is a perspective view of a partial structure of FIG. 20 at another viewing angle.
Figure 23:
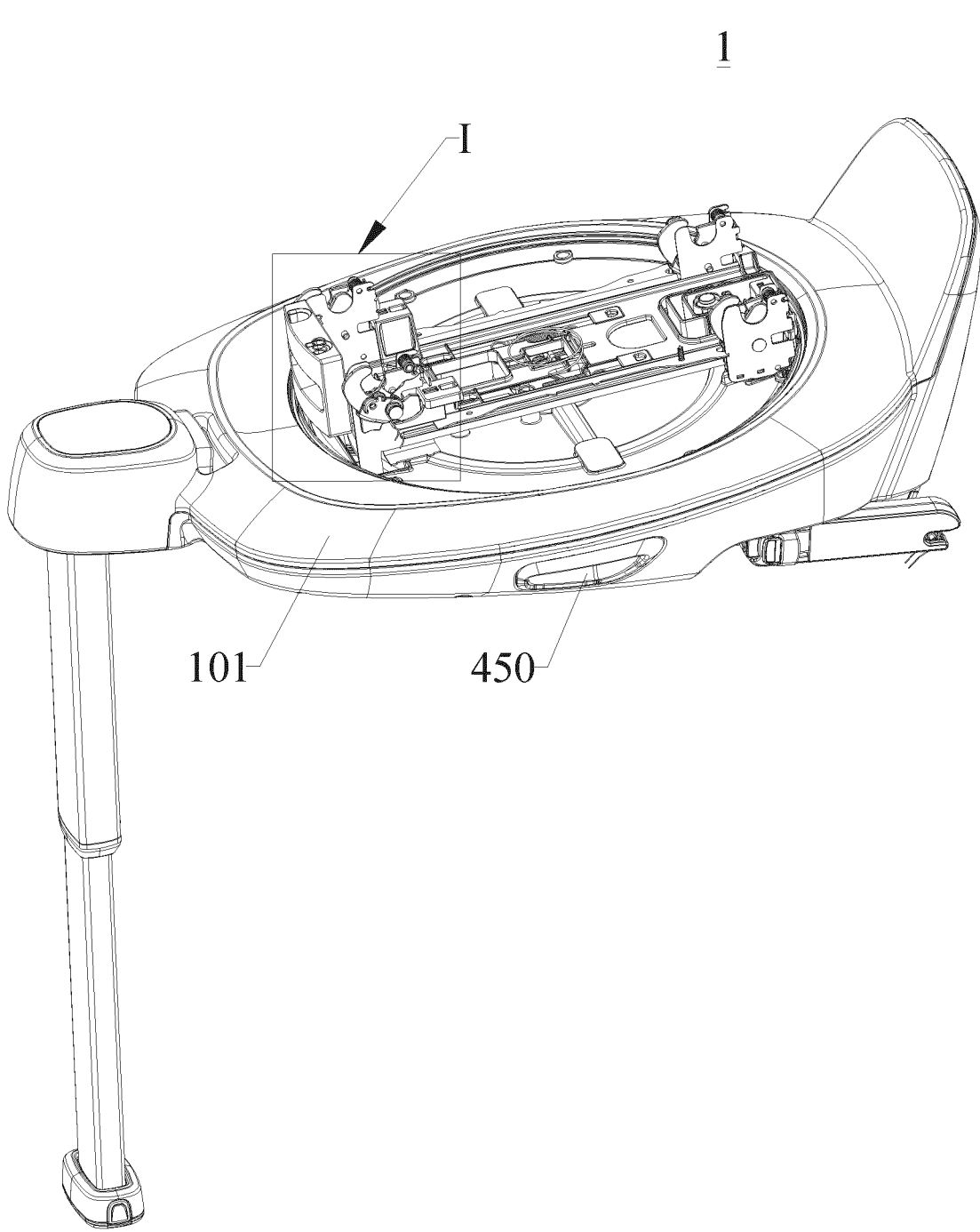
FIG. 23 is a perspective view of another internal structure of FIG. 19, where a locking hook is in an opened position.
Figure 24:
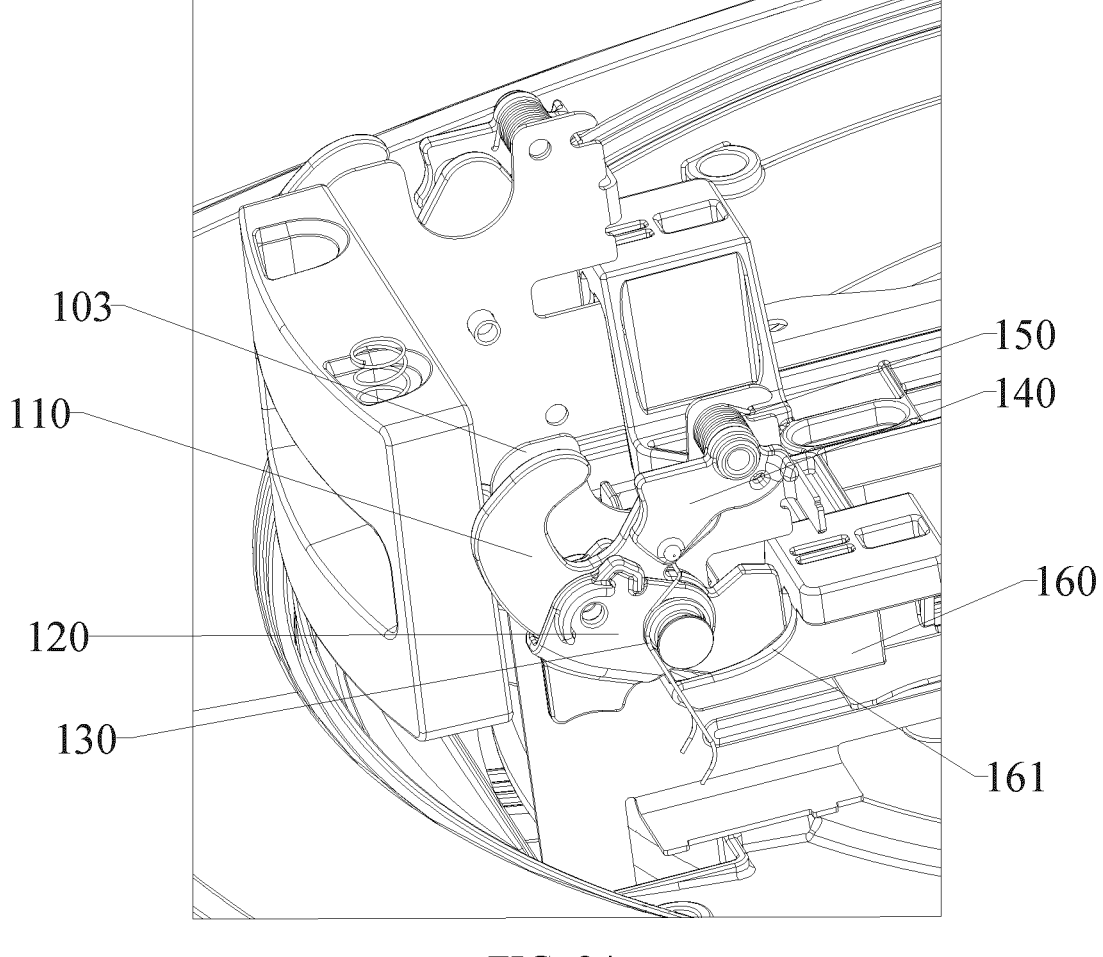
FIG. 24 is an enlarged view of a portion I of FIG. 23.
Figure 25:
FIG. 25 is a perspective view of another internal structure of FIG. 19, where a locking hook is in a closed position.
Figure 26:
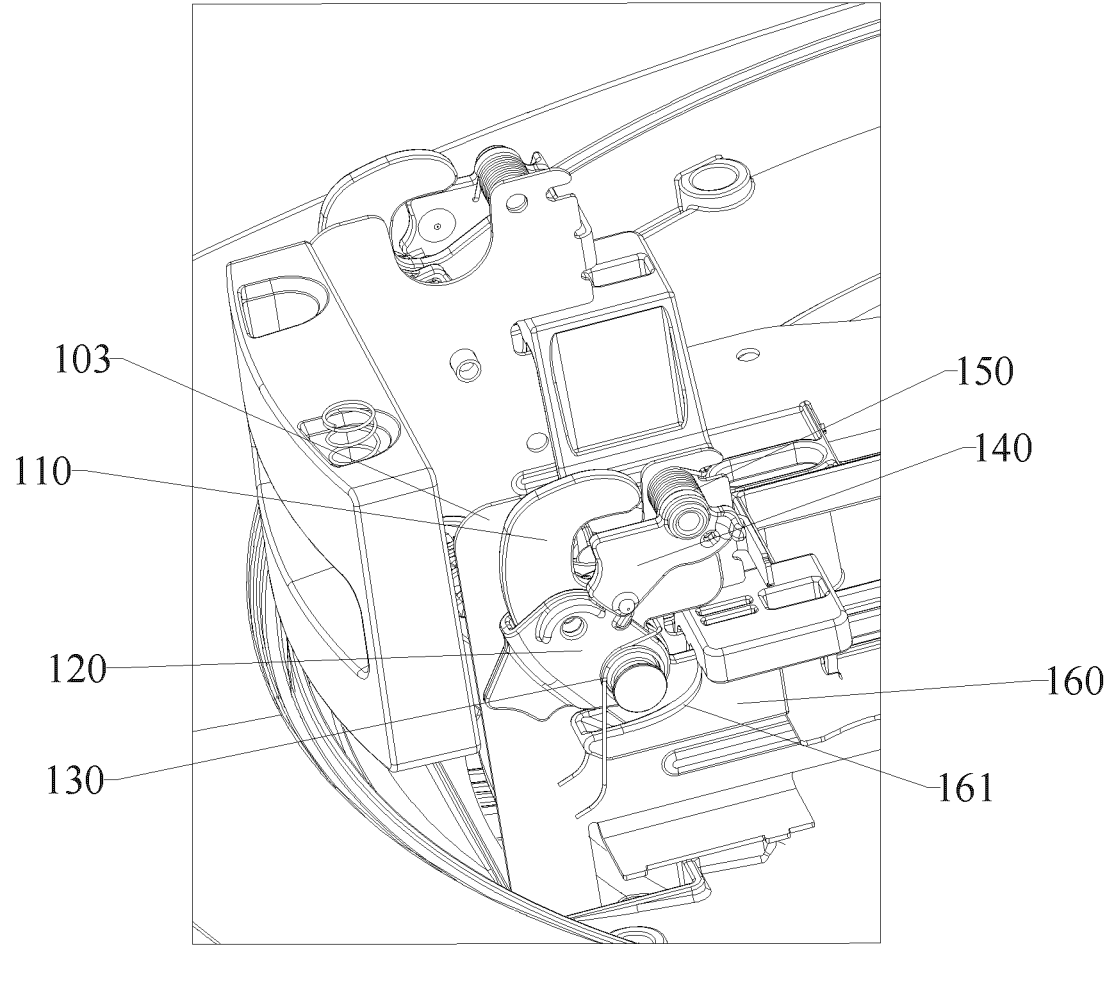
FIG. 26 is an enlarged view of a portion J of FIG. 25.

Referring to FIG. 19 and FIG. 20, there are two handles 450, and the two handles 450 are respectively disposed on both sides of the mounting base 101 and are exposed on a side surface of the mounting base 101, so as to facilitate user's operation. Compared with the previous embodiment in which the handle 450 is located at the front end of the mounting base 101 in the foregoing embodiment, the handle 450 being located on a side of the mounting base 101 can better facilitate the operation. This is because the front end of the mounting base 101 is usually blocked by the seat body 2 and the front car seat and is difficult to reach, but the side of the mounting base 101 is directly opposite to an operator and the operation is easier.

Referring to FIG. 20, FIG. 27, and FIG. 29, there are two corresponding pulling elements 460, and each pulling element 460 is connected between the handle 450 on a side of the pulling element 460 and the first pivoting element 410*a*. When the handle 450 is operated, the pulling element 460 pulls to drive the first pivoting element 410*a* to rotate from the third position to the fourth position. In the illustrated embodiment, by operating the handle 450 upwards, the pulling element 460 can be used to pull and drive the first pivoting element 410*a*. In other embodiments, the handle 450 may be operated by other means. The pulling element 460 may be a steel wire rope, but is not limited hereto, and may also be another similar component with desirable toughness and strength. Specifically, a guide element 108 is provided on the mounting base 101, and an arc-shaped guide portion is provided on the guide element 108. One end of the pulling element 460 is connected to the handle 450 on any side of the pulling element 460. The other end of the pulling element 460 enters the mounting base 101 along a direction indicated by an arrow F6 (i.e., a horizontal width of the mounting base 101), is guided by the guide element 108 to go around the guide portion, and is connected to the first pivoting element 410*a* along a direction indicated by an arrow F7 (i.e., a length direction of the mounting base 101).

With reference to FIG. 21 to FIG. 34, when the first pivoting element 410*a* is in the third position, the first push element 420*a* is in a relatively low position in the mounting cylinder 106, and referring to FIG. 32, the seventh restoration element 450*a* is in a natural state. In this case, the sliding element 160 is in the locking position and the locking hook 110 maintains in the closed position, referring to FIG. 30. The handle 450 is pulled to pull, through the pulling element 460, the first pivoting element 410a to rotate along the direction indicated by the arrow F8 shown in FIG. 29. In this process, the first pivoting element 410a acts on and deforms the seventh restoration element 450a. In a rotation process of the first pivoting element 410a, the drive guide groove 107 drives the first push element 420a to slide upwards in the direction indicated by the arrow F2. The first push element 420a then pushes the second push element 430a to slide upwards along the direction indicated by the arrow F2, and a side wall or a bottom wall of the mounting groove 431a of the second push element 430a pushes the second pivoting element 440a to rotate along the direction indicated by the arrow F9 in FIG. 32, so that the abutting end 442a abuts against the abutting protrusion block 164 to drive the sliding element 160 to move along the direction reverse to the direction indicated by the arrow F1, until the sliding element 160 moves to the unlocking position, referring to FIG. 34. In a sliding process of the sliding element 160, the third restoration element 170 is further stretched. When the sliding element 160 moves to the unlocking position, the locking hook 110 may automatically pivotally rotate and open under the action of the fifth restoration element 130.

After the handle 450 is released, the first pivoting element 410a restores to the third position under the action of the seventh restoration element 450a, thereby driving the first push element 420a to slide downwardly in the direction reverse to the direction indicated by the arrow F2, so that the second push element 430a also slides downwardly in this direction, referring to FIG. 32. The second pivoting element 440a rotates in the direction reverse to the direction indicated by the arrow F9 and no longer abuts against the abutting protrusion block 164, referring to FIG. 32. The sliding element 160 loses the force of the second pivoting element 440a, and therefore restores under the action of the third restoration element 170, thereby pressing against the locking hook 110 again to maintain the locking hook 110 in the opened position, referring to FIG. 28.

Referring to FIG. 1 to FIG. 34, the work principle of the seat base 1 for the child safety seat will be described in further details.

When the seat body 2 is not buckled into the seat base 1, under the elastic force of the fifth restoration element 130, the locking hook 110 is located in the opened position shown in FIG. 5 and FIG. 6. At the same time, the sliding element 160 is located in the unlocking position in FIG. 6, and the linkage element 210 is located in the second indication position, that is, the second indication area 320 (the red area) is aligned with the indication window 330.

When the buckling rod 201 of the seat body 2 is buckled into the buckling groove 102 on the seat base 1, the buckling rod 201 pushes downwards the hook portion 111 of the locking hook 110 to drive the hook portion 111 to pivotally rotate around the pivoting shaft 113. Thus, the locking hook 110 is driven to overcome the elastic force of the fifth restoration element 130, so that the hook portion 111 rotates to a position above the buckling rod 201, to lock the buckling rod 201 moved into the buckling groove 102. After the locking hook 110 pivotally rotates around the pivoting shaft 113, the stopper 140 abuts against the fastening element 120 to maintain stable locking of the locking hook 110. After the locking hook 110 rotates and is buckled into the buckling rod 201, the sliding element 160 slides under the elastic force of the third restoration element 170 along the direction reverse to the direction indicated by the arrow F1 in FIG. 4, FIG. 6, FIG. 10, FIG. 11, and FIG. 14, to abut against the locking hook 110 again and maintain the locking hook 110 in the closed position.

During the sliding process, the sliding element 160 drives the push protrusion 162 below the sliding element 160 to push the push button 240 to move downwards along the direction indicated by the arrow F2 shown in FIG. 11, FIG. 14, and FIG. 15. The push button 240 acts on the abutting portion 233 of the rotation element 230 in the movement process, so that the rotation element 230 pivotally rotates around the pivoting shaft of the rotation element 230 along the direction indicated by the arrow F5 shown in FIG. 11. Therefore, the first connecting end 231 of the rotation element 230 swings to drive the linkage element 210 to slide along the direction indicated by the arrow F4 in FIG. 10, FIG. 11, and FIG. 16, so that the first indication area 310 (the green area) is aligned with the indication window 330, indicating that the seat body 2 is buckled into the seat base 1. In addition, the push button 240 presses and deforms the second restoration element 250 in the process of moving downwards, and the linkage element 210 presses and deforms the first restoration element 220 in the sliding process.

When the seat body 2 requires to be detached from the seat base 1, in an embodiment, the user pulls the handle 450, and the handle 450 drives the drive element 410 to slide to the second position along the direction indicated by the arrow F4 in FIG. 7, FIG. 10, FIG. 11, FIG. 14, and FIG. 15. In this process, the drive element 410 drives the first mandrel 420 to move upwards along the direction indicated by the arrow F2, the first mandrel 420 then pushes the second mandrel 430 to continue to move in this direction, and the driving slope 431 of the second mandrel 430 acts on the driven slope 163 of the sliding element 160 to drive the sliding element 160 to move along the direction indicated by the arrow F1, so that the four blocking portions 161 on the sliding element 160 no longer abut against the locking hooks 110. In this case, the locking hooks 110 automatically pivotally rotate to the opened position under the action of the fifth restoration element 130, so that the hook portions 111 rotate away from the buckling grooves 102. In this case, the seat body 2 may be lifted from the seat base 1 to detach the seat body 2.

In the process in which the sliding element 160 moves along the direction indicated by the arrow F1, the push protrusion 162 of the sliding element 160 is gradually detached from the push button 240 and no longer exerts a downward force on the push button 240. Therefore, the push button 240 moves upwards and restores under the action of the second restoration element 250, that is, the push button 240 moves upwards along the direction indicated by the arrow F2 shown in FIG. 11, FIG. 14, and FIG. 15, and then no longer exerts a force on the abutting portion 233 of the rotation element 230. In this case, the linkage element 210 may restore under the action of the first restoration element 220, that is, slide along the direction reverse to the direction indicated by the arrow F4, so that the second indication area 320 (the red area) is aligned with the indication window 330 again, indicating that the seat body 2 is not buckled into the seat base 1.

In another embodiment, the user operates the handle 450, and the handle 450 drives the first pivoting element 410a to rotate to the fourth position along the direction indicated by the arrow F8 in FIG. 27 and FIG. 29. In this process, the first pivoting element 410a drives the first push element 420a to move upwards along the direction indicated by the arrow F2, the first push element 420a then pushes the second push element 430a to continue to move in this direction, and the second push element 430*a* pushes the second pivoting element 440*a*, so that the second pivoting element 440*a* rotates in the direction indicated by the arrow F9 in FIG. 32 and FIG. 34. The abutting end 442*a* of the second pivoting element 440*a* acts on the abutting protrusion block 164 of the sliding element 160, and drives the sliding element 160 to move in the direction reverse to the direction indicated by the arrow F1, so that the four blocking portions 161 on the sliding element 160 no longer abut against the locking hooks 110. In this case, the locking hooks 110 automatically pivotally rotate to the opened position under the action of the fifth restoration element 130, so that the hook portions 111 rotate away from the buckling grooves 102. In this case, the seat body 2 may be lifted from the seat base 1 to detach the seat body 2.

During the process in which the sliding element 160 moves along the direction reverse to the direction indicated by the arrow F1, the push protrusion 162 of the sliding element 160 is gradually detached from the push button 240 and no longer exerts a downward force on the push button 240. Therefore, the push button 240 moves upwards and restores under the action of the second restoration element 250, that is, the push button 240 moves upwards along the direction indicated by the arrow F2 in FIG. 28 and FIG. 30, and then no longer exerts a force on the abutting portion 233 of the rotation element 230. In this case, the linkage element 210 may restore under the action of the first restoration element 220, that is, slide along the direction reverse to the direction indicated by the arrow F4, so that the second indication area 320 (the red area) is aligned with the indication window 330 again, indicating that the seat body 2 is not buckled into the seat base 1.

In conclusion, according to the seat base 1 of the present disclosure, the linkage mechanism 200 is disposed between the buckling mechanism 100 and the indication mechanism 300. The buckling mechanism 100 implements buckling between the seat base 1 and the seat body 2, and when the buckling mechanism 100 is buckled into the seat body 2 or is unbuckled from the seat body 2, the linkage mechanism 200 can drive the indication area to present different indication states. In this way, the user may conveniently view the connection state of the seat base 1 and the seat body 2. This is more convenient and highly safe in usage. In addition, the seat base 1 has a simple structure, and both manufacturing difficulty and manufacturing costs are low.

The technical features of the above embodiments may be combined arbitrarily. To make the description concise, not all possible combinations of the various technical features in the above embodiments are described. However, as long as combinations of these technical features have no contradiction, the combinations shall fall within the scope of this specification.

The above embodiments only list several implementations of the present invention and are described in detail, but should not be understood as a limitation on the scope of the invention patent. It should be noted that those of ordinary skill in the art may further make several improvements and refinements without departing from the idea of the present invention, and these improvements and refinements also fall within the protection scope of the present invention. Therefore, the protection scope of the invention patent shall be subject to the appended claims.

What is claimed is:
1. A seat base of a child safety seat, comprising:
   a buckling mechanism configured to buckle into a seat body;

an indication mechanism comprising an indication area, wherein the indication area is configured to indicate a buckling state of the seat base and the seat body; and
a mounting base; and
a linkage mechanism disposed between the buckling mechanism and the indication mechanism, the linkage mechanism comprising:
   a rotation element rotatably connected inside the mounting base;
   a linkage element connected to the rotation element and the indication area; and
   a push button movably disposed on the mounting base, the push button abuts against the buckling mechanism and the rotation element, respectively, and the buckling mechanism is capable of driving the push button to slide, so that the push button pushes the rotation element to rotate;
wherein when the buckling mechanism is buckled into the seat body, the rotation element rotates to drive the linkage element to drive the indication area to present a first indication state; and when the buckling mechanism is unbuckled from the seat body, the rotation element rotates to drive the linkage element to drive the indication area to present a second indication state.

2. The seat base according to claim 1, wherein the linkage mechanism further comprises a first restoration element, the first restoration element abuts against the linkage element and the mounting base, respectively, and the first restoration element constantly enables the linkage element to move towards a direction that drives the indication area to present the second indication state.

3. The seat base according to claim 1, wherein the linkage mechanism further comprises a second restoration element, the second restoration element abuts against the mounting base and the push button, respectively, and the second restoration element constantly enables the push button to move towards a direction reverse to a direction along which the push button is pushed by the buckling mechanism.

4. The seat base according to claim 1, wherein the buckling mechanism comprises a sliding element slidably disposed on the mounting base, when the sliding element slides, the sliding element is capable of pushing the push button to move along a direction that intersects a sliding direction of the sliding element, and when the push button moves, the push button drives the rotation element to rotate to drive the linkage element to move;
   wherein the sliding element is provided with a push protrusion that protrudes along a direction that intersects the sliding direction of the sliding element, and when the sliding element slides, the push protrusion pushes the push button to move.

5. The seat base according to claim 4, wherein the buckling mechanism further comprises a locking hook that is pivotally connected to the mounting base and has an opened position and a closed position, the locking hook is configured to be detachably fastened to the seat body, and the sliding element is capably of maintaining the locking hook in the opened position or the closed position.

6. The seat base according to claim 5, wherein the buckling mechanism further comprises a third restoration element, the third restoration element abuts against the sliding element and the mounting base, respectively, and the third restoration element constantly enables the sliding element to move towards a direction that maintains the locking hook in the opened position.

7. The seat base according to claim 5, wherein the buckling mechanism further comprises a fastening element mounted on the mounting base and a fifth restoration element connected to the fastening element, the locking hook is pivotally connected to the fastening element and abuts against the fifth restoration element, and the fifth restoration element constantly enables the locking hook to rotate towards the opened position;

wherein the buckling mechanism further comprises a stopper and a sixth restoration element, one end of the stopper is pivotally connected to the mounting base, the other end of the stopper is connected to the locking hook, the sixth restoration element abuts against the stopper and the mounting base, respectively, and the sixth restoration element constantly enables the locking hook to rotate towards the opened position.

8. The seat base according to claim 4, further comprising an unlocking mechanism, wherein the unlocking mechanism is disposed on the mounting base and is configured to drive the sliding element to slide;

wherein the unlocking mechanism comprises a drive element and a first mandrel that slidably cooperate with each other, the drive element is slidably mounted on the mounting base, the first mandrel is movably disposed and abuts against the sliding element, and when the drive element moves under a force, the drive element is capable of driving the first mandrel to move along a direction that intersects a sliding direction of the drive element, so that the first mandrel pushes the sliding element to drive the sliding element to slide;

wherein the drive element is provided with a drive chute that intersects the sliding direction of the drive element, a first guide rod is disposed on the first mandrel, the first guide rod is inserted inside the drive chute and moves along the drive chute, and when the drive element slides, the drive chute acts on the first guide rod to drive the first mandrel to move.

9. The seat base according to claim 8, wherein the unlocking mechanism further comprises a second mandrel movably disposed between the first mandrel and the sliding element, and when the first mandrel moves, the first mandrel pushes the second mandrel to move co-directionally, so that the second mandrel drives the sliding element to slide;

wherein a driving slope is provided at an end portion of the second mandrel, the sliding element is provided with a driven slope that cooperates with the driving slope, and the driving slope acts on the driven slope to drive the sliding element to slide.

10. The seat base according to claim 8, wherein the unlocking mechanism further comprises a handle movably mounted on the mounting base, the handle is connected to the drive element and drives the drive element to move;

wherein the unlocking mechanism further comprises a pulling element connected between the handle and the drive element;

wherein the handle is disposed at an end of the mounting base adjacent to the indication mechanism.

11. The seat base according to claim 8, wherein the unlocking mechanism further comprises a fourth restoration element, the fourth restoration element abuts against the drive element and the mounting base, respectively, and the fourth restoration element is configured to drive the drive element to restore.

12. A child safety seat, comprising the seat base according to claim 1, and a seat body detachably fastened on the seat base.

13. The child safety seat according to claim 12, wherein the seat base is provided with a buckling groove, the buckling mechanism partially protrudes into the buckling groove, and the seat body is provided with a buckling rod at the bottom thereof configured to buckle into the buckling mechanism.

14. A seat base of a child safety seat, comprising:
a mounting base;
a buckling mechanism configured to buckle into a seat body, the buckling mechanism comprising a sliding element slidably disposed on the mounting base;
an indication mechanism comprising an indication area, wherein the indication area is configured to indicate a buckling state of the seat base and the seat body; and
a linkage mechanism disposed between the buckling mechanism and the indication mechanism; and
an unlocking mechanism, wherein the unlocking mechanism is disposed on the mounting base and is configured to drive the sliding element to slide;
wherein when the buckling mechanism is buckled into the seat body, the linkage mechanism drives the indication area to present a first indication state; and when the buckling mechanism is unbuckled from the seat body, the linkage mechanism drives the indication area to present a second indication state, and
wherein the unlocking mechanism comprises a first pivoting element and a first push element, the first pivoting element is pivotally connected to the mounting base, the first push element is movably disposed and is capable of driving the sliding element to move, and when the first pivoting element rotates under a force, the first pivoting element is capable of driving the first push element to move along a direction that intersects the sliding direction of the sliding element, so that the first push element drives the sliding element to slide.

15. The seat base according to claim 14, wherein the mounting base is provided with a drive guide groove that intersects the sliding direction of the sliding element, a second guide rod is disposed on the first push element, the second guide rod is connected to the first pivoting element, the second guide rod is inserted inside the drive guide groove and moves along the drive guide groove, and when the first pivoting element rotates, the drive guide groove acts on the second guide rod to drive the first push element to move.

16. The seat base according to claim 14, wherein the unlocking mechanism further comprises a second push element and a second pivoting element, the second push element is movably disposed between the first push element and the sliding element, the second pivoting element is pivotally connected to the second push element and abuts against the sliding element, and when the first push element moves, the first push element pushes the second push element to move co-directionally, so as to drive the second pivoting element to rotate and push the sliding element to slide, simultaneously.

17. The seat base according to claim 14, wherein the unlocking mechanism further comprises at least one handle movably mounted on the mounting base, the at least one handle is connected to the first pivoting element, and the at least one handle drives the first pivoting element to rotate;

wherein the unlocking mechanism further comprises a pulling element connected between the at least one handle and the first pivoting element;

wherein the at least one handle is disposed on a side of the mounting base and along the sliding direction of the sliding element.

18. The seat base according to claim 14, wherein the unlocking mechanism further comprises a seventh restoration element, the seventh restoration element abuts against the first pivoting element and the mounting base, respectively, and the seventh restoration element is configured to drive the first pivoting element to restore;

wherein the indication mechanism further comprises an indication window disposed on the mounting base, and the indication area is aligned with the indication window.

*     *     *     *     *